United States Patent
Jo et al.

(10) Patent No.: US 9,911,294 B2
(45) Date of Patent: Mar. 6, 2018

(54) WARNING SYSTEM AND METHOD USING SPATIO-TEMPORAL SITUATION DATA

(71) Applicants: Min Sung Jo, Seoul (KR); Se Young Kim, Seoul (KR)

(72) Inventors: Min Sung Jo, Seoul (KR); Se Young Kim, Seoul (KR)

(73) Assignees: Myung Ho Ha, Seoul (KR); Jeong Han Park, Yangsan-si, Gyeongsangnam-do (KR)

( * ) Notice: Subject to any disclaimer, the term of this patent is extended or adjusted under 35 U.S.C. 154(b) by 0 days.

(21) Appl. No.: 15/116,783

(22) PCT Filed: Feb. 5, 2015

(86) PCT No.: PCT/KR2015/001186
§ 371 (c)(1),
(2) Date: Aug. 4, 2016

(87) PCT Pub. No.: WO2015/119439
PCT Pub. Date: Aug. 13, 2015

(65) Prior Publication Data
US 2016/0351031 A1     Dec. 1, 2016

(30) Foreign Application Priority Data

Feb. 5, 2014 (KR) ........................ 10-2014-0013036

(51) Int. Cl.
*G08B 13/00* (2006.01)
*G08B 13/196* (2006.01)
*G06K 9/00* (2006.01)

(52) U.S. Cl.
CPC ... *G08B 13/19684* (2013.01); *G06K 9/00771* (2013.01); *G08B 13/19615* (2013.01)

(58) Field of Classification Search
None
See application file for complete search history.

(56) References Cited

FOREIGN PATENT DOCUMENTS

| KR | 1020090035379 | * | 10/2007 |
|---|---|---|---|
| KR | 10-2009-0032379 A | | 4/2009 |
| KR | 1020110001172 | * | 6/2009 |
| KR | 10-2010-0050226 A | | 5/2010 |
| KR | 10-2011-0001172 A | | 1/2011 |
| KR | 10-1207197 B1 | | 12/2012 |
| KR | 1020110086975 | * | 12/2012 |

* cited by examiner

*Primary Examiner* — Adolf Dsouza
(74) *Attorney, Agent, or Firm* — Bret E. Field; Bozicevic, Field & Francis LLP

(57) ABSTRACT

The warning system using spatiotemporal situation data according to the present invention comprises: a situation detection unit including a sensor module for sensing human-related data in environments requiring an early warning concerning security and anti-crime situations; a situation recognition unit which is configured to set a sensing region to be sensed by the situation detection unit and event conditions according to the spatiotemporal situation data, set a human subject as a human sensing condition according to the spatiotemporal situation data, and determine the occurrence of an event by comparing the human-related data sensed by the situation detection unit with data about the set sensing region, the event condition data according to the spatiotemporal situation data.

20 Claims, 8 Drawing Sheets

WARNING SYSTEM AND METHOD USING SPATIO-TEMPORAL SITUATION DATA

CROSS-REFERENCE TO RELATED APPLICATION

This application is a Section 371 National Stage Application of International Application No. PCT/KR2015/001186, filed on Feb. 5, 2015, the contents of which is hereby incorporated by reference in its entirety.

TECHNICAL FIELD

The present disclosure relates to an autonomous warning technology using spatio-temporal situation data, and more particularly, to a warning method and system using spatio-temporal situation data, in which a surrounding situation signal is detected and received by a detection unit including one or more sensor modules in an environment requiring an early warning for security and anti-crime situations such as border-crossing, infiltration, theft, assault, and kidnapping so that a current situation can be determined and a warning signal can be autonomously transmitted to a control center of a security/anti-crime-related organization or a person who can give a help to others by using situation data obtained by combining event signals regarding security and crime prevention with spatio-temporal situation-specific conditions.

BACKGROUND ART

In general, examples of a method for ensuring security and crime prevention include an artificial surveillance method performed by a person in charge of security and crime prevention, a remote surveillance method using a surveillance or monitoring camera, and a dangerous situation transmission method using a sensor of a terminal carried by an individual. Meanwhile, the remote surveillance method using a surveillance camera is divided into two schemes: a manual scheme in which a surveillant is a human and a fully-automatic scheme in which a surveillant is a mechanical system.

In the case of the artificial surveillance method, the artificial surveillance is performed by a relevant person who is in charge in crime prevention or personnel of a private security and anti-crime company in an anti-crime site.

However, at present, most countries encounter realistic problems in that they absolutely lack in relevant anti-crime personnel compared to personnel engaged in an area requiring security and crime prevention, and much economic burdens are imposed on the countries in order to entrust the supply of the relevant anti-crime personnel to private security and anti-crime companies.

In an attempt to solve such problems, most countries adopt a remote surveillance system using a surveillance camera installed on an anti-crime site. In addition, a service increases annually in which a security program is installed on a smartphone that is simple and convenient for an individual to carry so that personal security-related information is transmitted to a control PC of a security-related agency However, the dangerous situation transmission method using a sensor of a terminal carried by an individual has a limitation in detection of a situation based on a sensor. Therefore, since it is difficult for the dangerous situation transmission method to expect to have a great effect, there is a need for a more accurate detection method in the personal security field.

An image surveillance system of detecting the occurrence of any particular act or accident is recognized as being most important in the research fields using human tracking.

The reason for this is that as a society advances, the importance of the safety of individuals and facilities are highly recognized in a public place as well as a personal space As a modern society increasingly follows a trend toward informatization, unmannization, automatization, and computerization, the safety of individuals and the safety in a place of business continuously appear as important issues. Thus, efforts for protecting and managing the properties and the safety of individuals and the place of business have been made continuously. The importance and coverage of the security has been widened to major facilities, public offices, schools, enterprises, and private homes. Therefore, there is a need for the recognition of the importance and the development of the image surveillance system.

A typical example of such an image surveillance system includes a control (or surveillance) system using a network camera (CCTV). The CCTV control system is evolving drastically along with the development of an image input technology, an image transmission technology, and an image output technology.

An up-to-date CCTV control system outputs images inputted from a plurality of cameras on a plurality of monitors arranged inside a control center or arranges and outputs a plurality of lattice-shaped images on a single monitor. Then, an operator or a manager performs a surveillance activity while observing images outputted on the monitor.

By the way, the number of the network cameras used in the control system is increasing over time, thus leading to a great increase in the amount of the image data inputted to the control system. Such an increase in the image data acts as a transmission load in a network, thus resulting in a degradation of image quality.

For example, if the number of the network cameras is greater than 100, all of the images are not outputted on the monitor screen at one time, but are outputted in such a manner as to circulate the whole images. In addition, there occurs a problem in that a resolution of the images being outputted is degraded.

Further, it is difficult to know where two-dimensional images displayed on a monitor are located due to an increase in the number of the network cameras, which causes a problem in that the degree of understanding of images is decreased. Therefore, there is a need for the development of an intelligent control system for rapidly processing and efficiently monitoring video image data increasing by a user.

In the meantime, since a conventional surveillance method in which an operator or a manager performs a surveillance activity while observing images output on the monitor depends on a continuous observation by a human, it is inefficient and has a high risk of missing an abnormal situation as a surveillance target due to a reduction in the ability to concentrate. Therefore, the development and research of an intelligent surveillance system has been made continuously.

The intelligent surveillance system refers to a system that analyzes images inputted from a camera in real-time, and detects, tracks and sorts a moving object.

In particular, information on an object is provided to a manager in real-time by determining whether or not the object generates an event corresponding to a security polity, and a function of post management and prevention can be maximized after storing related data and event information.

A research on an up-to-date object detection and tracking system is made focusing on a particular scene or situation rather than the movement of an object. For example, an active shape model (ASM) has been proposed which analyzes the outer components of the object existing in an image based on a training set consisting of human-shaped models to estimate the most similar model in the training set.

In addition, in order to solve a problem such as an overlapping phenomenon, a model-based algorithm using extraction and analysis of a human-like silhouette from an image has been proposed, and a real-time blob (Blob) tracking algorithm using a human as a model has also been proposed.

As another conventional method, a method has been proposed which employs the support vector machine (SVM) to create a pattern and statistically analyze the pattern using wavelets as features of objects existing in an image. Also, a method has been proposed which separately creates a pedestrian pattern and a non-pedestrian pattern, respectively, using a simple and rapid Adaboost algorithm in order to recognize a pedestrian.

Besides, various methods have been proposed which effectively and accurately detects an object to attempt an access according to data analysis, but a research has not been sufficiently made yet on a method of analyzing an image while being targeted to a specific situation.

In this case, situation information regarding the specific situation generated by the object substantially includes all the information available at the time point when an interaction is made between users, and information that can be detected by an application as part of an application operation environment. In order to implement such an intelligent (smart) environment, situation recognition and information collection are needed by sensors having various kinds and functions such as temperature, humidity, illumination, pressure, acceleration, gradient, camera, infrared ray(IR), visible light, motion, magnetic fields, etc. Particularly, since the location of an object is important information for the purpose of situation recognition and information collection, a research on various services is in progress.

The recognition of who (i.e., an object) does what where is required to recognize a situation.

In order to recognize information on "who", as of now, it is required to identify each ID of objects to be tracked as a factor critical in the pervasive computing environment.

In recent years, an automatic object recognition and tracking technology in the video sequence is applied in a variety of fields such as an unmanned surveillance system, an intelligent transportation system, a military system, etc. However, the automatic object recognition and tracking technology enables the grasping of the number of tracking object, and the recognition of a boundary line intrusion and a defined behavior pattern, but still entails a problem in that it cannot identify an ID of an object which it is desired to track.

Meanwhile, in order to recognize information on "what", it is required to recognize a correct location and behavioral pattern. However, the information processing technology based on images has a difficulty in extracting features due to interference of light, shadow, and noise.

Therefore, there is an urgent need for the development of a situation information recognition technology that can more effectively recognize a situation of "who does what where" in order to construct a situation recognition system for implementing a variety of useful services.

DISCLOSURE

Technical Problem

Accordingly, the present invention has been made to solve the above-mentioned problems occurring in the prior art, and it is an object of the present disclosure to provide a warning system using spatio-temporal situation data, in which a surrounding situation is detected by a situation detection unit including a sensor module for detecting at least one surrounding situation information among position, video, audio, vibration, motion and environment information of an environment requiring an early warning for various types of security and anti-crime situations so that event data regarding security and crime prevention is combined with a plurality of time slot-specific situation data obtained by temporal means and spatial situation-specific data according to the environments, thereby warning an external system and a portable terminal in a more accurate and rapid manner.

Another object of the present invention is to provide a warning method using spatio-temporal situation data, in which a surrounding situation is detected by a situation detection unit including a sensor module for detecting at least one surrounding situation information among position, video, audio, vibration, motion and environment information of an environment requiring an early warning for various types of security and anti-crime situations so that event data regarding security and crime prevention is combined with a plurality of time slot-specific situation data obtained by temporal means and spatial situation-specific data according to the environments, thereby warning an external system and a portable terminal in a more accurate and rapid manner.

Technical Solution

To achieve the above and other objects, in accordance with one embodiment of the present disclosure, there is provided a warning method using spatio-temporal situation data, including: a situation detection unit including a sensor module for detecting at least one human-related data among position, video, audio, vibration, motion and environment information of an environment requiring an early warning for various types of security and anti-crime situations; a situation recognition unit 30 for setting one or more detection regions which are to be detected by the situation detection unit and event conditions based on spatio-temporal situation data, setting a human individual as a human detection condition based on the spatio-temporal situation data, comparing the human-related data detected by the situation detection unit with data regarding the set detection regions, data regarding the event conditions based on the spatio-temporal situation data, and data regarding the human individual to determine whether or not an event has occurred, and transmitting a warning signal to an external terminal through a communication network if it is determined that the event has occurred; a storage unit for storing the human-related data detected by the situation detection unit, the data regarding the detection regions set by the situation recognition unit, the data regarding the spatio-temporal event conditions of humans to be detected, and the data regarding the human individual; a time data reception unit for receiving current time information; and an input unit for inputting the spatio-temporal situation data on which the setting of the detection regions to be detected, the human individual, and the event conditions is based.

In accordance with a preferred embodiment of the present disclosure, the time data reception unit may receive exact time data necessary to allow the situation recognition unit to compare the spatio-temporal situation data and the data regarding the human individual of the human with the detected human-related data to determine whether or not the event has occurred at the moment when the human is detected by the situation detection unit.

In accordance with a preferred embodiment of the present disclosure, the human detection condition of the human individual, which is set by the situation recognition unit 30, may be composed of threshold values such as situation-specific images of the human according to expected spatio-temporal situation-specific activity patterns of a human who performs border-crossing/infiltration/theft/assault/kidnapping, stumbling or swinging motion, voice, footstep and distinctive movement speed/direction, and noises made by the human.

In accordance with a preferred embodiment of the present disclosure, the event conditions according to the spatio-temporal situation-specific activity patterns, which are set by the situation recognition unit may include at least one of the following detection conditions:

A. Border-Crossing/Infiltration Detection Condition (A) a case where a condition is satisfied in which a human determined as a human individual is detected as moving at a speed lower than a certain speed set by an operator at a certain distance set by an operator who is located near a detection region at a certain time set by the operator; and (A-1) a case where a condition is satisfied in which a human detected in the above condition (A) is detected as abutting against the outermost portion of the detection region, the human detected in the above condition (A) is detected as entering the outside or the inside of the detection region after passing through the outermost portion of the detection region, or the human detected in the above condition (A) is detected as moving in a certain direction set by the operator in a state of having entered the outside or the inside of the detection region.

B. Article Theft Detection Condition (B) a case where a condition is satisfied in which a human determined as a human individual is detected as moving at a speed lower than a certain speed set by an operator at a certain distance set by an operator who is located near a detection region at a certain time set by the operator; and (B-1) a case where a condition is satisfied in which a human detected in the above condition (B) is detected as abutting against the outermost portion of the detection region, the human detected in the above condition (B) is detected as entering the outside or the inside of the detection region after passing through the outermost portion of the detection region, the human detected in the above condition (B) is detected as moving in a certain direction and at a speed higher than a certain speed set by the operator after combining with an object of a certain size in a state of having entered the inside of the detection region, or the human detected in the above condition (B) is detected as moving in a certain direction and at a speed higher than a certain speed set by the operator in a state of having entered the inside of the detection region.

C. Assault/Kidnapping Detection Condition (C) a case where a condition is satisfied in which at least two humans determined as human individuals are detected as moving at a speed lower than a certain speed set by an operator while approaching each other at a distance shorter than a certain distance set by the operator at a certain time set by the operator;

(C-1) a case where a condition is satisfied in which a scream- or violence-related noise detected for more than a certain time from any one of the detected at least two humans based on the spatio-temporal situation data in the above condition is greater than a scream- or violence-related noise reference set by the operator, and then the scream- or violence-related noise is not re-detected within a certain time or a laughing sound is not detected at least once;

(C-2) a case where a condition is satisfied in which certain data set by the operator is detected from any one of the detected at least two humans for more than a certain time set by the operator in the above condition (C);

(C-3) a case where a condition is satisfied in which vehicle-related data and certain data set by the operator are detected from any one of the detected at least two humans for more than a certain time set by the operator in the above condition (C);

(C-4) a case where a condition is satisfied in which if the certain data detected from any one of the detected at least two humans in the above condition (C-3) has a level lower than that of the certain data in the above condition (C-2), any one of the detected at least two humans holds a smartphone SP installed with the warning system S using spatio-temporal situation data according to claim 1, and at which time the situation recognition unit 30 of the terminal C automatically transmits a warning signal to a certain contact C set by the operator and does not receive, more than the number of times set by the operator, a signal from a person concerned of the contact C set by the operator; and (C-5) a case where a condition is satisfied in which if any one case is fulfilled from among the case where data in which the smartphone SP roams around or goes far away from a certain area is detected for more than a certain time set by the operator, the case where the warning system S using spatio-temporal situation data is terminated without undergoing a certain termination process, and the case where the warning system using spatio-temporal situation data is not operated for more than a certain time set by the operator from a time point when data regarding the abnormal termination situation is transmitted to a terminal C of the person concerned, in the above condition (C-3), the inventive system S installed in the terminal C primarily automatically transmits a warning signal to the certain contact C set by the operator, at which time if the system does not receive, more than the number of times for more than a certain time set by the operator, a signal from a person concerned of the contact C set by the operator, the inventive system S installed in the terminal C secondarily automatically transmits the warning signal to the certain contact C set by the operator and then does not receive, more than the number of times for more than a certain time set by the operator, a signal from the person concerned of the contact C set by the operator.

To achieve the above and other objects, in accordance with another embodiment of the present disclosure, there is provided a warning method using spatio-temporal situation data, including the steps of: (1) allowing a situation recognition unit to determine whether or not human-related data of at least one of detection regions is inputted through a sensor module of a situation detection unit; (2) allowing the situation recognition unit to compare the inputted human-related data with preset human individual data and determine whether or not the inputted human-related data is a human individual of the preset human individual data; (3) allowing the situation recognition unit to determine whether or not the detection region of which the inputted human-related data is determined as the human individual is any one selected from among a border-crossing/infiltration detection region, an article theft detection region, and an assault/kidnapping detection region, and then store the human-related data in a storage unit; (4) allowing, if it is determined that the detection region is the border-crossing/infiltration detection region, the situation recognition unit to compare the detected human-related data with data regarding set detection regions, data regarding the event conditions based on the spatio-temporal situation data, and data regarding the human individual to determine whether or not an event has occurred; (5) allowing, if it is determined that the detection region is the article theft detection region, the situation recognition unit to compare the detected human-related data with data regarding set detection regions, data regarding the event conditions based on the spatio-temporal situation data, and data regarding the human individual to determine whether or not an event has occurred; (6) allowing, if it is determined that the detection region is the assault/kidnapping detection region, the situation recognition unit to compare the detected human-related data with data regarding set detection regions, data regarding the event conditions based on the spatio-temporal situation data, and data regarding the human individual to determine whether or not an event has occurred; and (7) allowing, if is determined that any one of a border-crossing/infiltration event, an article theft event, and an assault/kidnapping event has occurred, the situation recognition unit to transmit a warning signal to an external terminal through a communication network.

In accordance with a preferred embodiment of the present disclosure, a security/anti-crime event may include (A) a border-crossing/infiltration event, (B) an article theft event, and (C) an assault/kidnapping event, and each of these events may be composed of subroutines.

In accordance with a preferred embodiment of the present disclosure, the spatio-temporal situation data may include data regarding a particular time slot-specific physiological pattern and a particular time slot-specific social pattern that are distinct from other creatures, data regarding time slot-specific crime rates, data regarding a physiological behavior pattern and a social behavior pattern that are taken by the human at the place at a particular time slot in a criminal situation, and data regarding a particular behavior pattern associated with a criminal situation at the place, may be configured based on statistical data and scientific data, and may be used as a standard data that determines a threshold value for the detection of the event by the situation recognition unit.

In accordance with a preferred embodiment of the present disclosure, the external terminal to which the warning signal from the situation recognition unit is to be transmitted may be a control PC of a CCTV control center, a police operation room, or a smartphone and may receive the warning signal from the situation recognition unit, and a transmission contact number of the situation recognition unit may be directly set by an operator through the input unit.

In accordance with a preferred embodiment of the present disclosure, the warning system using spatio-temporal situation data may be installed and operated in a smartphone and a CCTV control PC of an individual and an enterprise requiring security/anti-crime.

In accordance with a preferred embodiment of the present disclosure, the situation-specific image data used to detect the human among data regarding the human individual set by the operator may be set as a long elliptical shape similar to the outward appearance of a human, a shape in which a small circle similar to the shape of a head portion of the human and a long elliptical shape similar to that of a body portion of the human under the head portion are combined with each other, or a shape in which the small circle similar to the shape of the head portion of the human and a long rectangular shape similar to that of the body portion of the human under the head portion are combined with each other.

In this case, the image data may be detected as a human when it is determined that a situation of the figure is a form in which the figure is generally perpendicular to the ground surface and a moving speed is a 'walking or running speed' or when it is determined that the figure is a form in which the figure is generally in parallel with the ground surface and the moving speed is a 'crawling speed' in the case where the image data is a distinctive figure in which a relatively small and round-shaped figure abuts against the uppermost end of the long elliptical shape or the long rectangular shape of the figure, or the image data may be detected as a human when it is determined that a situation of the figure is a situation in which the figure stays at a place for more than a certain period of time set by an operator' in the case where the image data is a round circular shaped figure, and the image data is detected as an animal in the case other than the above-described conditions. In addition, a sensor module of the situation detection unit for detecting the human based on the image data performs a detection function through at least one of a camera sensor and a motion sensor, and a sensor module for detecting the 'walking or running speed' of the human performs a detection function through at least one of a camera sensor, a microphone, and a vibration sensor.

Advantageous Effect

The warning system and method using spatio-temporal situation data in accordance with the present disclosure as constructed above have the following advantageous effects.

At least one human-related data of an environment requiring an early warning for various types of security and anti-crime situations is detected and the detected human-related data is combined with the spatio-temporal situation data to determine whether or not an event occurring is event data regarding security and anti-crime and autonomously give a warning so that a real-time rapid response can be made.

In addition, the use of a variety of spatio-temporal situation data other than video data enables the highly accurate determination of a warning situation only with less computer resources so that the disadvantages of a conventional image surveillance system can be overcome and the system construction costs can be significantly reduced.

BRIEF DESCRIPTION OF THE DRAWINGS

The above objects, other features and advantages of the present disclosure will become more apparent by describing the preferred embodiments thereof with reference to the accompanying drawings, in which.

Figure 1:
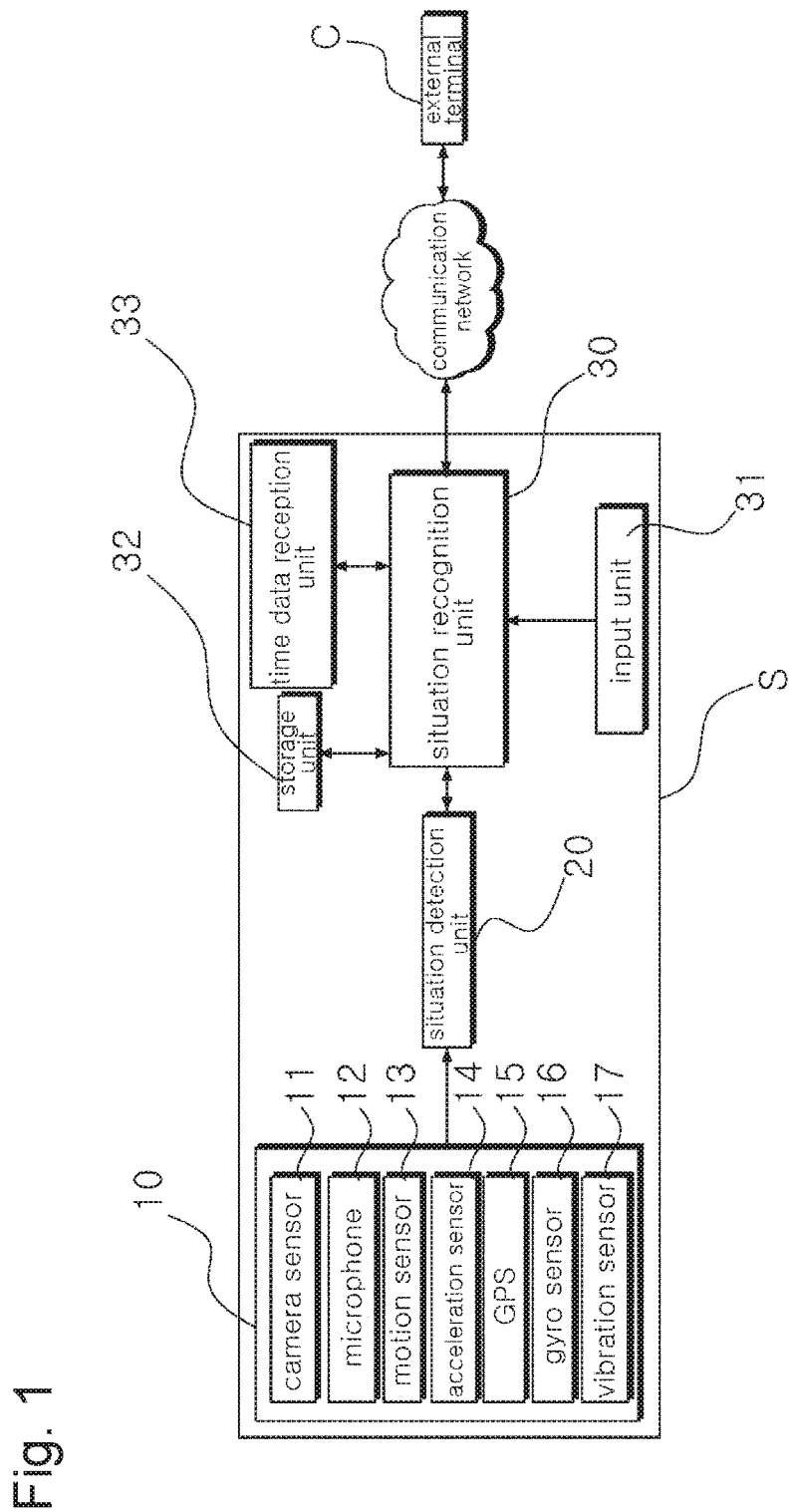
FIG. 1 is a block diagram showing the configuration of a warning system using spatio-temporal situation data in accordance with an embodiment of the present disclosure.

Explanation on reference numerals of main elements in the drawings

S: warning system using spatio-temporal situation data
SP: smartphone installed with a warning system using spatio-temporal situation data
10: sensor module
21: cable line
30 situation recognition unit
32: storage unit
40: communication network
V1: first patrol direction
S401-S403: humans
L1: boundary line
M21-M26: figure set with human image data
A21-A22: figure set with animal image data
A: animal
20: situation detection unit
L21~L23: detection region
31: input unit
33: time data reception unit
C: external terminal
V2: second patrol direction
S404: border barbed wire fence
L2: imaginary line orthogonal to L1

PREFERRED EMBODIMENTS OF THE INVENTION

Hereinafter, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Now, preferred embodiments of the present disclosure will be described hereinafter in detail with reference to the accompanying drawings.

It should be noted that the same elements in the drawings are denoted by the same reference numerals although shown in different figures.

In addition, in the following description, the detailed description on known function and constructions unnecessarily obscuring the subject matter of the present disclosure will be avoided hereinafter.

Besides, it is, of course, to be noted that the preferred embodiments of the present invention will be described hereinafter, but the technical features of the present disclosure may be modified by a person of ordinary skill in the art without being limited thereto so that the present disclosure can be carried out in various forms.

The terms or words used in the specification and the claims of the present invention should not be construed as being typical or dictionary meanings, but should be construed as meanings and concepts conforming to the technical spirit of the present invention on the basis of the principle that an inventor can properly define the concepts of the terms in order to describe his or her invention in the best way.

Additionally, in the specification, when a portion "includes" an element, it is meant to include other elements, but not exclude the other elements unless otherwise specifically stated herein.

In addition, the terms such as " . . . unit" and "module" described in the specification means units that performs at least one function or operation, which may be implemented by software or hardware, or a combination of software and hardware.

First, a warning method and system using spatio-temporal situation data in accordance with a preferred embodiment of the present invention will be described hereinafter.

FIG. 1 is a block diagram showing the configuration of a warning system using spatio-temporal situation data in accordance with an embodiment of the present disclosure.

The warning system S using spatio-temporal situation data in accordance with the present invention includes: a situation detection unit 20 including a sensor module 10 for detecting at least one human-related data among position, video, audio, vibration, motion and environment information of an environment requiring an early warning for various types of security and anti-crime situations; a situation recognition unit 30 for setting a plurality of detection regions L21-L23 which are to be detected by the situation detection unit and event conditions based on spatio-temporal situation data, setting a human individual as a human (S401-S403) detection condition based on the spatio-temporal situation data, comparing the human-related data detected by the situation detection unit 20 with data regarding the set detection regions, data regarding the event conditions based on the spatio-temporal situation data, and data regarding the human individual to determine whether or not an event has occurred, and transmitting a warning signal to an external terminal C through a communication network 40 if it is determined that the event has occurred; a storage unit 32 for storing the human-related data detected by the situation detection unit 20, the data regarding the detection regions L21-L23 set by the situation recognition unit 30, the data regarding the spatio-temporal event conditions of humans S401-S403 to be detected, and the data regarding the human individual; a time data reception unit 33 for receiving current time information; and an input unit 31 for inputting the spatio-temporal situation data on which the setting of the detection regions to be detected, the human individual, and the event conditions is based.

The sensor module 10 includes a GPS 15 attached to various types CCTV cameras or portable terminals such as smartphones, a motion sensor (e.g., an infrared sensor, an ultrasonic sensor, and a microwave sensor) 13, an acceleration sensor 14, a gyro sensor 16, a light sensor, a vibration sensor 17, a microphone 12, and a camera sensor 11. The sensor module 10 detects an environment requiring an early warning for various types of security and anti-crime situations.

The human (S401-S403) detection condition of the human individual, which is set by the situation recognition unit 30, is composed of threshold values such as situation-specific images (M21-M26) of the human according to expected spatio-temporal situation-specific activity patterns of a human (S401-S403) who performs border-crossing/ infiltration/theft/assault/kidnapping, stumbling or swinging motion, voice, footstep and distinctive movement speed/direction, and noises made by the human (S401-S403).

The situation-specific image data (M21-M26) used to detect the human (S401-S403) among data regarding the human individual set by the operator is set as a long elliptical shape similar to the outward appearance of a human, a shape (see M21-M26) in which a small circle similar to the shape of a head portion of the human and a long elliptical shape similar to that of a body portion of the human under the head portion are combined with each other, or a shape in which the small circle similar to the shape of the head portion of the human and a long rectangular shape similar to that of the body portion of the human under the head portion are combined with each other. In this case, the image data is detected as a human when it is determined that a situation of the detected human is a form (M23) in which the figure is generally perpendicular to the ground surface and a moving speed is a 'walking or running speed' or when it is determined that the figure is a form (M22) in which the figure is generally in parallel with the ground surface and the moving speed is a 'crawling speed' in the case where the image data is a distinctive figure in which a relatively small and round-shaped figure abuts against the uppermost end of the long elliptical shape or the long rectangular shape of the figure, or the image data is detected as a human when it is determined that a situation of the detected human is a situation in which the detected human stays at a place for more than a certain period of time (e.g., 5 minutes) set by an operator' in the case where the image data is a round circular shaped figure, and the image data is detected as an animal (A) in the case other than the above-described conditions.

The spatio-temporal situation data includes data regarding a particular time slot-specific physiological pattern (e.g., a pattern of sleeping after 10:00 p.m. at night, or the like) and a particular time slot-specific social pattern (e.g., a pattern of going to work at 08:00-09:00 a.m.) that are distinct from other creatures, data regarding time slot-specific crime rates (e.g., an sharp increase in crime rates of a particular playground for children after 16:00 p.m.), data regarding a physiological behavior pattern (e.g., a pattern in which an adult male who does not suit the playground walks suddenly in a fast walking manner after committing a crime) and a social behavior pattern (e.g., a pattern in which a human who commits a crime hangs around a store whose business hours are ended as a socially very awkward behavior pattern) that are taken by the human at the place at a particular time slot in a criminal situation, and data regarding a particular behavior pattern (e.g., a pattern in which a short child and a tall adult suddenly approach each other closely in a state of being are separated from each other in the playground, and then they move together after staying there for about five minutes) associated with a criminal situation at the place, is configured based on statistical data and scientific data, and is used as a standard data that determines a threshold value for the detection of the event by the situation recognition unit, so that a warning for the security and anti-crime situations can be given in a more accurate and rapid manner.

An information processing technology using an image of an existing image surveillance system for security and crime prevention has a difficulty in extraction of features due to interference of light, shadow and noise. Furthermore, such a conventional information processing technology entails a problem in that since the situations such as violence, theft, and the like are inferred with only image data acquired, accurate results are very difficult to obtain and a lot of resources are required.

In other words, it is very difficult for a system to infer the situations such as violence, kidnapping, theft, and the like instead of a human with only a human's behavioral image detected by the image surveillance system for security and crime prevention and much cost is required. Therefore, in order to improve this problem, it is required that time data and spatial data having the characteristics capable of simultaneously grasping various items of information be acquired.

A human being has a physiological pattern that is distinct from an animal. In addition, a human being lives a social life, and thus has a time slot-specific social pattern according to jobs and surrounding environments.

For example, some people get up at 8:00 a.m. whereas some people get up at 14:00 p.m. In addition, some stores close at 22:00 p.m., and some shops open for 24 hours a day. In this case, if someone hangs around for a while at 23:00 p.m. in front of a store that usually closes at 22:00 p.m., an owner of the store cannot help suspecting him.

In other words, an unmanned surveillance device can easily grasp a 'suspicious situation' based on spatio-temporal situation data obtained by combining video data obtained by capturing an image of a stranger who hangs around in front of the store, social life pattern data of the owner of the store that usually closes at 22:00 p.m., time data of 23:00 p.m., and general physiological pattern data that most people must stay at home at 23:00 p.m.

When the unmanned surveillance device determines such spatio-temporal situation data and transmits a warning signal to a terminal of the store owner, he or she will solve a problem after arriving at his or her store. If the data obtained by the unmanned surveillance device is merely video data, a system will have a great difficulty in determining the 'suspicious situation' instead of a person.

As another example, it can be assumed that someone crosses over the border into South Korea in a barbed wire fence area on the Korean military demarcation line. In this case, CCTVs are installed and operated at various points of the GOP barbed wire fence. If a person is detected as trying to cross over the border into South Korea at about 02:00 a.m., obtainable data are as follows:

1. Detection time data: If the detection time is a time other than the time when soldiers who stand guard duty at the barbed wire fence patrol the ceasefire line, the detected person is a person who certainly tries to cross over the border into South Korea.

2. Detection video data: The surveillance device does not need to recognize a complex gesture or behavioral pattern and it is just sufficient to detect only data that the outward appearance of a detected object is approximate to an elliptical shape. The reason for this is that if a human-shaped object was detected at that time because a determination is made by a combination of the data with 'non-patrol' time data, the detected person is a person who certainly tries to cross over the border into South Korea.

3. Spatial data: A space of the GOP barbed wire fence has a social pattern in which there is no person who passes by the barbed wire fence other than soldiers who stand guard duty at the barbed wire fence.

4. Moving speed data: The person who tries to cross over the border into South Korea has a physiological pattern in which he or she must move stealthily at the space. That is, the person knows that he or she must move slowly to avoid him or her from being revealed. Thus, if a human-shaped object that moves at a stealthy and very low speed is detected, the object is certainly a kind of person who does not want to be revealed by anyone. In other words, if any particular person is detected at a particular time and a particular place where a person must not be detected, he or she is preferably classified as a very 'suspicious person', and the spatio-temporal situation data is provided to promptly detect such a 'suspicious person'.

As such, in a situation where only a conventional intelligent video analytics cannot ensure a detection accuracy of 100%, a detection rate with an accuracy close to 100% can be implemented owing to a combination of the video data with the spatial data, the time data, the physiological pattern data, and the social pattern data.

In addition, the warning system S using spatio-temporal situation data of the present disclosure can analyze a situation with high accuracy through a combination of video data with other data (i.e., spatio-temporal situation data) despite the simple analysis of the video data to the maximum extent.

Further, the present disclosure enables a determination of whether or not an event has occurred through detection and comparison of surrounding situation data with only relatively less resources, and can implement a more accurate situation detection compared to a result of determination based on video analysis and inference so that the construction cost of an expensive unmanned surveillance device can be expected to be significantly reduced.

The situation recognition unit 30 sets a plurality of detection regions L21-L23 and event conditions based on spatio-temporal situation data, sets a human individual as a human (S401-S403) detection condition based on the spatio-temporal situation data, compares the surrounding situation data detected by the situation detection unit 20 with data regarding the set detection regions L21-L23, data regarding the event conditions based on the spatio-temporal situation data, and data regarding the human individual to determine whether or not an event has occurred, and transmits a warning signal to an external terminal C through a communication network 40 if it is determined that the event has occurred.

The external terminal C to which the warning signal from the situation recognition unit is to be transmitted is a control PC of a CCTV control center, a police operation room, or a smartphone and receives the warning signal from the situation recognition unit 30, and a transmission contact number of the situation recognition unit 30 is directly set by an operator through the input unit 31.

The event conditions according to the spatio-temporal situation-specific activity patterns, which are set by the situation recognition unit 30 include at least one of the following detection conditions:

A. Border-Crossing/Infiltration Event Condition (A) a case where a condition is satisfied in which a human S401 determined as a human individual M21 is detected as moving (M22) at a speed lower than a certain speed set by an operator at a speed certain distance set by an operator who is located near a detection region L21 at a certain time set by the operator; and (A-1) a case where a condition is satisfied in which a human S402 detected in the above condition (A) is detected as abutting against the outermost portion of the detection region, the human detected in the above condition (A) is detected as entering S403 the outside or the inside of the detection region after passing through the outermost portion of the detection region, or the human S402 detected in the above condition (A) is detected as moving S403 in a certain direction V3 set by the operator in a state of having entered the outside or the inside of the detection region L21, L1, B. Article Theft Event Condition (B) a case where a condition is satisfied in which a human S501 determined as a human individual M24 is detected as moving at a speed lower than a certain speed set by an operator at a certain distance set by an operator who is located near a detection region L22 at a certain time set by the operator; and (B-1) a case where a condition is satisfied in which a human S501 detected in the above condition (B) is detected as abutting against the outermost portion of the detection region L22, the human detected in the above condition (B) is detected as entering M24 the outside or the inside of the detection region after passing through the outermost portion of the detection region, the human S501 detected in the above condition (B) is detected as moving (not shown) in a certain direction and at a speed higher than a certain speed set by the operator after combining with an object of a certain size in a state M24 of having entered the inside of the detection region, or the human detected in the above condition (B) is detected as moving (not shown) in a certain direction and at a speed higher than a certain speed set by the operator in a state of having entered the inside of the detection region, and C. Assault/Kidnapping Event Condition (C) a case where a condition is satisfied in which at least two humans S601 and S602 determined as human individuals M25 and M26 are detected as moving at a speed lower than a certain speed set by an operator while approaching each other at a distance shorter than a certain distance set by the operator at a certain time set by the operator;

(C-1) a case where a condition is satisfied in which a scream- or violence-related noise detected for more than a certain time from any one of the detected at least two humans S601 and S602 based on the spatio-temporal situation data in the above condition (C) is greater than a scream- or violence-related noise reference set by the operator, and then the scream- or violence-related noise is not re-detected within a certain time or a laughing sound is not detected at least once;

(C-2) a case where a condition is satisfied in which certain data (e.g., violence-related noise of 80 db) set by the operator is detected from any one of the detected at least two humans S601 and S602 for more than a certain time (e.g., 10 seconds) set by the operator in the above condition (C);

(C-3) a case where a condition is satisfied in which vehicle-related data (e.g., vehicle door closing sound, etc.) set by the operator and certain data (e.g., a passenger's scream or an assailant's violence-related noise detected after five minutes of detection of a car door closing noise) set by the operator are detected from any one of the detected at least two humans S601 and S602 for more than a certain time (e.g., 5 minutes) set by the operator in the above condition (C);

(C-4) a case where a condition is satisfied in which if the certain data detected from any one of the detected at least two humans S601 and S602 in the above condition (C-3) has a level lower than that of the certain data in the above condition (C-2) (e.g., if the certain data in the above condition (C-3) does not reach the violence-related noise reference set by the operator), any one of the detected at least two humans S601 and S602 holds a smartphone SP installed with the warning system S using spatio-temporal situation data, and at which time the situation recognition unit 30 of the terminal C automatically transmits a warning signal to a certain contact C set by the operator and does not receive, more than the number of times set by the operator, a signal from a person concerned of the contact C set by the operator (e.g., since the certain data in the above condition (C-3) has a level that does not reach the violence-related noise reference set by the operator, anyone who can give a help contacts the detected at least one human with an intent to confirm the current situation but the assailant does not miss the phone call. Thus this situation can be regarded as a violence situation); and (C-5) a case where a condition is satisfied in which if any one case is fulfilled from among the case where data in which the smartphone SP roams around or goes far away from a certain area (e.g., 500 m separated from the certain area) is detected for more than a certain time set by the operator, the case where the warning system S using spatio-temporal situation data is terminated without undergoing a certain termination process, and the case where the warning system using spatio-temporal situation data is not operated for more than a certain time (e.g., 1 minute, etc.) set by the operator from a time point when data regarding the abnormal termination situation is transmitted to a terminal C of the person concerned, in the above condition (C-3), the inventive system S installed in the terminal C primarily automatically transmits a warning signal to the certain contact C set by the operator, at which time if the system does not receive, more than the number of times for more than a certain time (e.g., five seconds) set by the operator, a signal from a person concerned of the contact C set by the operator, the inventive system S installed in the terminal C secondarily automatically transmits the warning signal to the certain contact C set by the operator and then does not receive, more than the number of times for more than a certain time (e.g., five seconds) set by the operator, a signal from the person concerned of the contact C set by the operator.

Herein, a time slot having a high possibility of occurrence of an event in detection of the border-crossing/infiltration event is set as follows:

In the case where the detection region is a border, the time slot having a high possibility of occurrence of the event is set as a time slot (e.g., 15:00-15:10 p.m.) other than the time slot when an image is detected in which soldiers who are in charge of performing border guard services patrol the border. In addition, in the case where the detection region is a major national facility, the time slot having a high possibility of occurrence of the event is set as a time slot (e.g., 21:00 p.m.-07:00 a.m.) when no one must exist averagely in the surroundings of a barbed wire fence or a boundary wall. Further, in the case where the detection region is rice fields or fields, the time slot having a high possibility of occurrence of the event is set as a time slot (e.g., 04:00-06:00 a.m.) when frequent infiltration occurs averagely. In the case where the detection region is a private home, a store or an office, the time slot having a high possibility of occurrence of the event is set as a time slot (e.g., 19:00 p.m.-07:00 a.m.) when no one must come in and go out averagely. Besides, in the case where the detection region is an elementary school, the time slot having a high possibility of occurrence of the event is set as a time slot (e.g., 08:00 a.m.-16:00 p.m.) when no one must be detected except elementary school students averagely.

In addition, a time slot having a high possibility of occurrence of an event in detection of the article theft event is set as follows:

In the case where the detection region is a place where the surroundings of the detection region is patrolled periodically by a person in charge of patrol, the time slot having a high possibility of occurrence of the event is set as a time slot (e.g., 22:00-22:10 p.m.) other than the time slot when an image is detected in which the person in charge of patrol patrols the detection region. In addition, in the case where the detection region is a place where there is no one who patrols and many people come and go, the time slot having a high possibility of occurrence of the event is set as a time slot (e.g., 01:00-04:00 a.m.) when no one must exist averagely in the surroundings of the detection region. In addition, in the case where the detection region is a place where there is no one who patrols and people rarely come and go, the time slot having a high possibility of occurrence of the event is set as a time slot (e.g., 02:00-04:00 a.m.) when frequent infiltration occurs averagely. Further, in the case where the detection region is a private home, a store or an office, the time slot having a high possibility of occurrence of the event is set as a time slot (e.g., 10:00 p.m.-06:00 a.m.) when no one must be detected averagely. Moreover, in the case where the detection region is an elementary school, the time slot having a high possibility of occurrence of the event is set as a time slot (e.g., 08:00 a.m.-16:00 p.m.) when no one must be detected except elementary school students averagely.

In addition, a time slot having a high possibility of occurrence of an event in detection of the assault/kidnapping event is set as follows:

In the case where the detection region is a place where the surroundings of the detection region is patrolled periodically by a person in charge of patrol, the time slot having a high possibility of occurrence of the event is set as a time slot (e.g., 02:00 a.m.-02:10 a.m.) other than the time slot when an image is detected in which the person in charge of patrol patrols the detection region. In addition, in the case where the detection region is a place where there is no one who patrols and many people come and go, the time slot having a high possibility of occurrence of the event is set as a time slot (e.g., 01:00-05:00 a.m.) when no one must exist averagely in the surroundings of the detection region. In addition, in the case where the detection region is a place where there is no one who patrols and people rarely come and go, the time slot having a high possibility of occurrence of the event is set as a time slot (e.g., 04:00 a.m., etc.) when frequent assault/kidnapping occurs averagely. Further, in the case where the detection region is a private home, a store or an office, the time slot having a high possibility of occurrence of the event is set as a time slot (e.g., 01:00-05:00 a.m.) when no one must be detected averagely.

In particular, the vehicle-related data set by the operator in the condition (C-3) includes a vehicle door closing sound, and the detection of the data in which the smartphone SP roams around or goes far away from a certain area in the condition (C-5) is performed in such a manner that a preset 'question' window having no connection with the warning situation progress is displayed on a screen of the smartphone SP so that an assailant of the assault/kidnapping event cannot know the warning situation progress immediately after the condition (C-3) is fulfilled (see S604 of FIG. 4), i.e., if a warning transmission situation is exposed to the outside in a state in which an assailant seized an assaultee's terminal, harm may be done to the assaultee, in which case the 'question' window having no connection with the warning situation progress is displayed in order to prevent the warning situation progress from being exposed to the outside to protect the assaultee.), and if the assaultee does not have a preset answer to the question within a certain time or makes a false answer to the question consecutively twice, the data is detected as a warning situation.

The event conditions of the situation in which the human detected in the above condition (B-1) moves in a state of having entered the outside or the inside of the detection region (L21, L1) and which is set by the situation recognition unit 30 are as follows: In the case where the detected human crosses over a barbed wire fence S404 or a boundary wall installed in a border or a major national facility, the moving speed of the human S402 is lower than a certain speed (e.g., 100 m/h) and the situation is silent; In the case where an object has a moving direction V3 generally perpendicular to the barbed wire fence or crosses over a barbed wire fence or a boundary wall installed in rice fields or fields and the crop is cheap (e.g., corn fields, etc.), the object is an animal that is smaller than a human and is approximate to an elliptical shape (A21, A22) in its entirety; In the case where an object has a moving speed higher than a certain speed (e.g., 10 km/h, etc.), has a voice peculiar to animals, and has a moving speed lower than a certain speed (e.g., 1 km/h) in the course of giving damage to the crop, and the crop is expensive (e.g., ginseng fields, etc.), the object is a human individual; and In the case where an object has a moving speed lower than a certain speed (e.g., 2 km/h, etc.), has a moving direction V3 generally perpendicular to the barbed wire fence or the boundary wall, or intrudes a private home, a stores or an office, the object is a human individual who has a very low moving speed (e.g., 1 km/h, etc.) and is very quick (e.g., 7 km/h, etc.) when running away after the intrusion.

Figure 2:
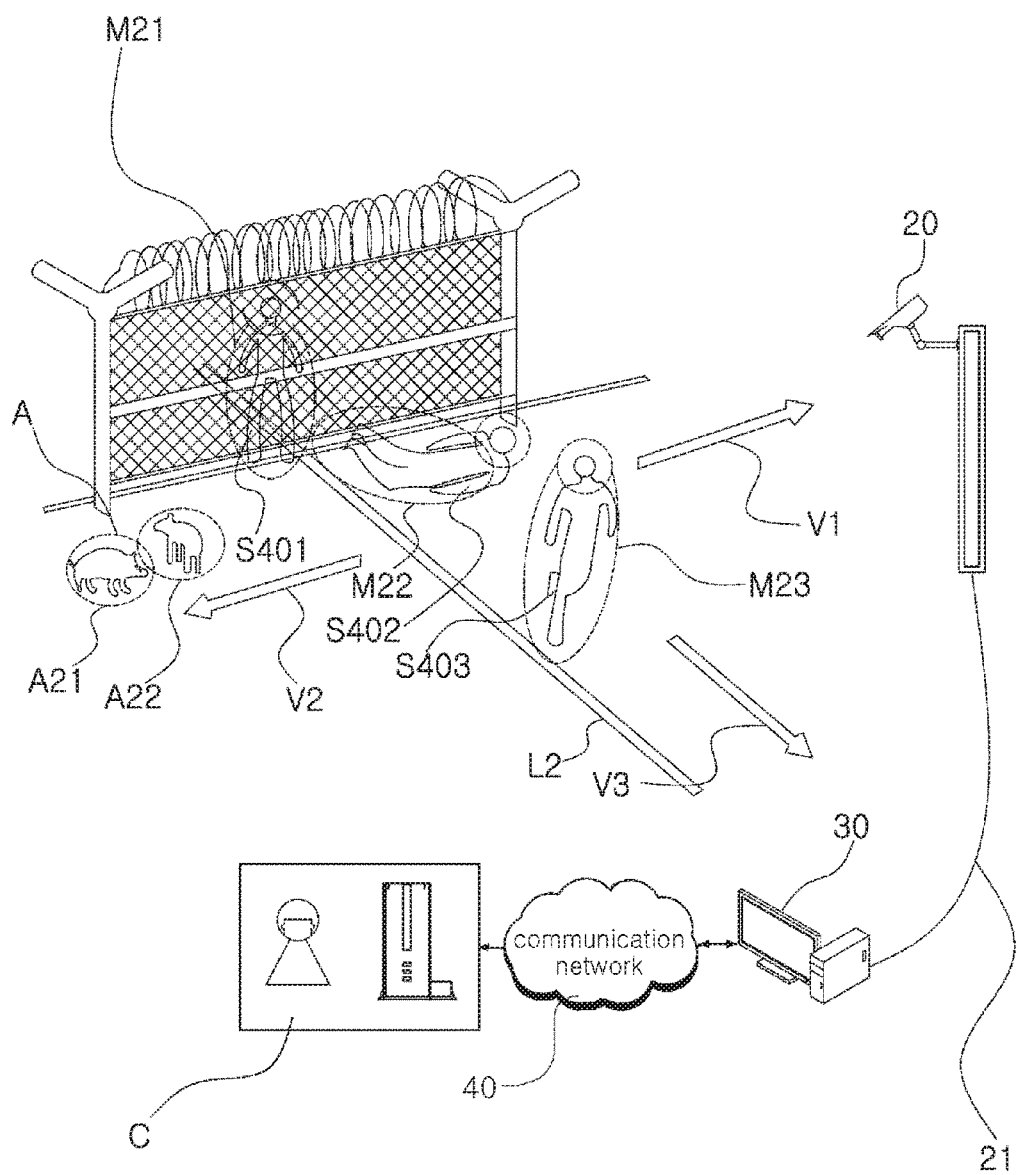
FIG. 2 is a schematic diagram showing a situation in which a warning system using spatio-temporal situation data in accordance with an embodiment of the present disclosure is operated to monitor the surrounding s of a barbed wire fence of a border.

FIG. 2 is a schematic diagram showing a situation in which a warning system S using spatio-temporal situation data in accordance with an embodiment of the present disclosure is operated to monitor the surrounding s of a barbed wire fence S404 of a border;

Referring to FIG. 2, a situation detection unit 20 of the present disclosure sets a specified portion of a GOP barbed wire fence S404 as a detection region L21 through a situation recognition unit 30, and detects a human S501 who crosses over the border into a boundary line L1 (step S410) so that when a border-crossing event of a border crossing person S402 occurs (S460), the situation recognition unit 30 transmits a warning signal (S800) to a surrounding guard post C through a communication network 40. The GOP barbed wire fence S404 a social pattern in which soldiers who are in charge of performing border guard services passes by the barbed wire fence while patrolling the barbed wire fence. In this case, the situation detection unit 20 detects the detection region L21 during the time period other than a time slot when soldiers patrol the barbed wire fence. When a human is detection at the time point other than the patrol time slot, he or she is certainly a person who tries to cross over the border into South Korea.

Figure 3:
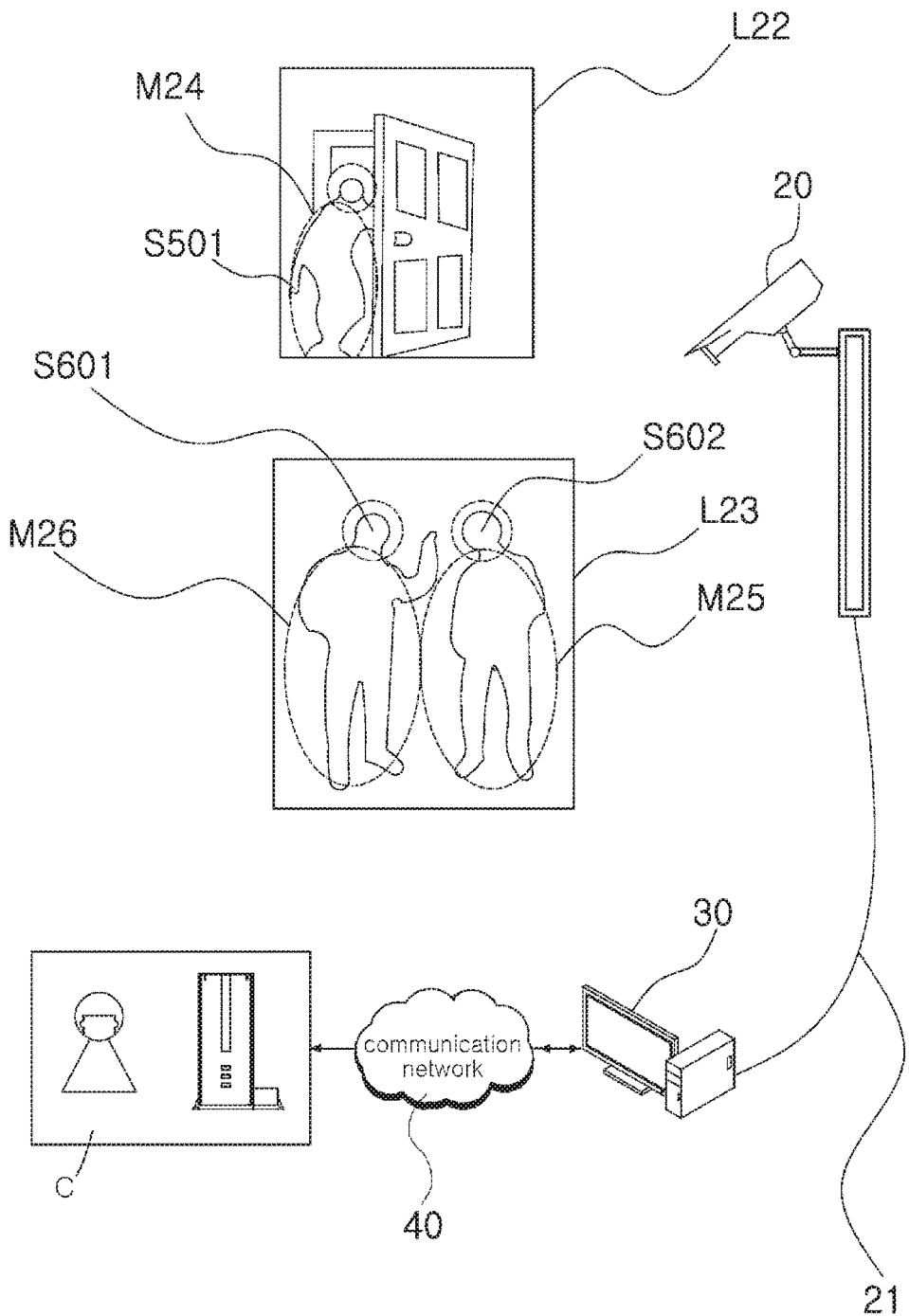
FIG. 3 is a schematic diagram showing a situation in which a warning system using spatio-temporal situation data in accordance with an embodiment of the present disclosure detects intrusion and assault.

FIG. 3 is a schematic diagram showing a situation in which a warning system using spatio-temporal situation data in accordance with an embodiment of the present disclosure detects intrusion and assault.

Referring to FIG. 3, the situation detection unit 20 of the present disclosure detects a specified portion of a bank door set by the situation recognition unit 30 as a detection region L22. When the situation detection unit 20 detects a human S501 who intrudes a bank (step S510) so that when an intrusion event of the intruder S502 occurs (step S560), the situation recognition unit 30 transmits a warning signal (S800) to a surrounding police operation room C through the communication network 40. The bank has a social pattern in which it stops doing business and closes. In this case, the situation detection unit 20 detects the detection region L22 after the time when the bank closes. When a human is detection at a time slot other than the bank closing time, he or she is certainly a person who tries to intrude the bank.

Figure 4:
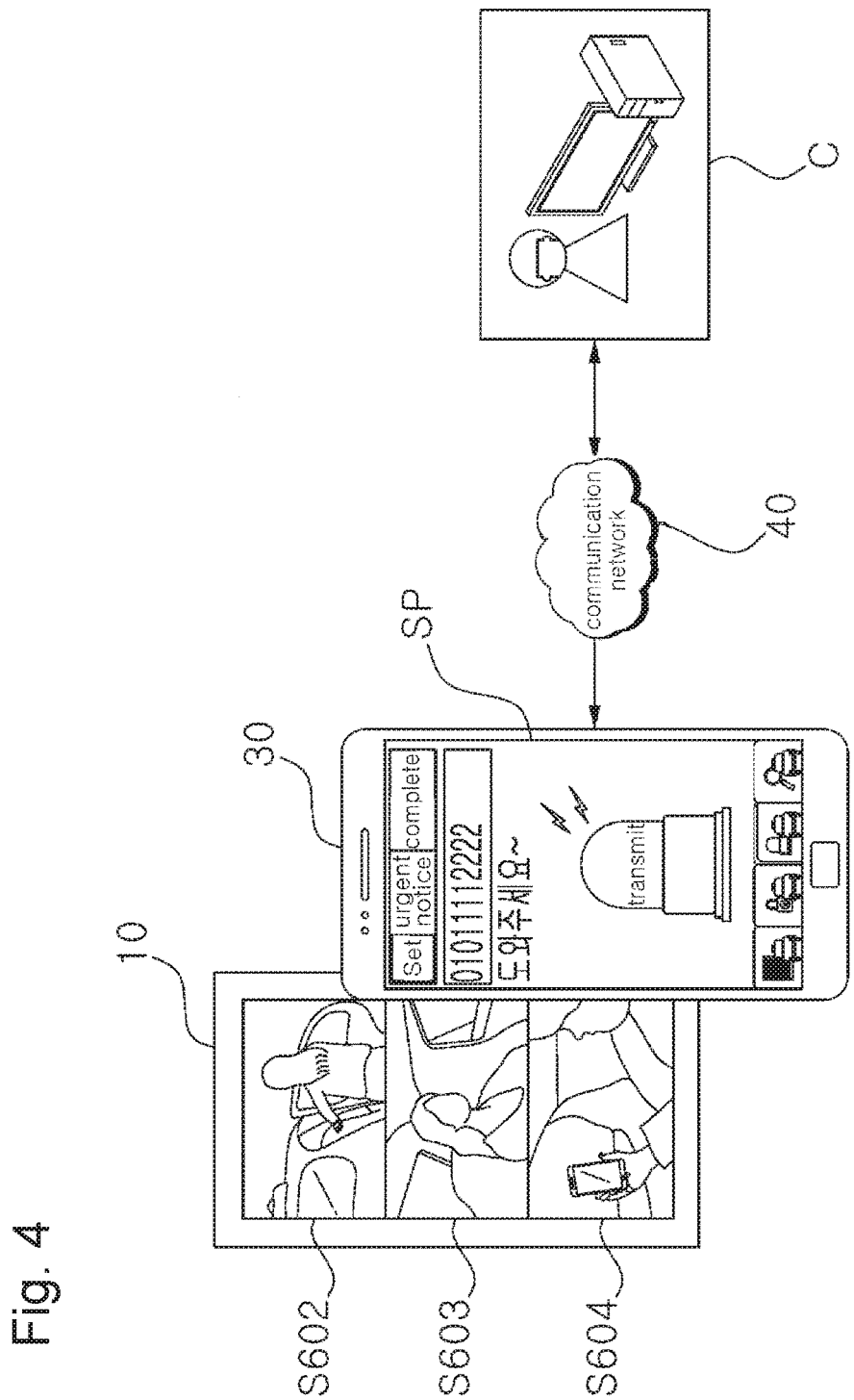
FIG. 4 is a schematic diagram showing a situation in which a warning system using spatio-temporal situation data in accordance with an embodiment of the present disclosure detects kidnapping.

FIG. 4 is a schematic diagram showing a situation in which a warning system using spatio-temporal situation data in accordance with an embodiment of the present disclosure detects kidnapping.

Referring to FIG. 4, the situation is the case where the warning system S using spatio-temporal situation data is installed in the user's smartphone SP for the purpose of ensuring a user individual's safety. In this case, the situation detection unit 20 of the smartphone SP may include various sensor modules such as a camera sensor 11 of a smartphone PS, a microphone 12, a motion sensor 13, an acceleration sensor 14, a GPS, and a gyro sensor 16. The situation detection unit 20 can set the surroundings of the user as a detection region (e.g., a circle with a radius of 3 m around the user) through the situation recognition unit 30, and an example can be given in which someone boards a cab (S602). In this case, the passenger is forced to close a cab door immediately after he or she sits on the cab's seat (S603). The microphone 12 of the situation detection unit detects the cab door closing sound (S610). As a result of detection, if it is detected that a kidnapping event by a driver occurs (S660 to S680), the situation recognition unit is set to transmit a warning signal to a surrounding police operation room C through a communication network 40. If the cab door is closed and then the cab starts to deviate from a route toward the passenger' home, there is a high possibility that the cab driver will be a person who tries to kidnap the passenger.

Figure 5:
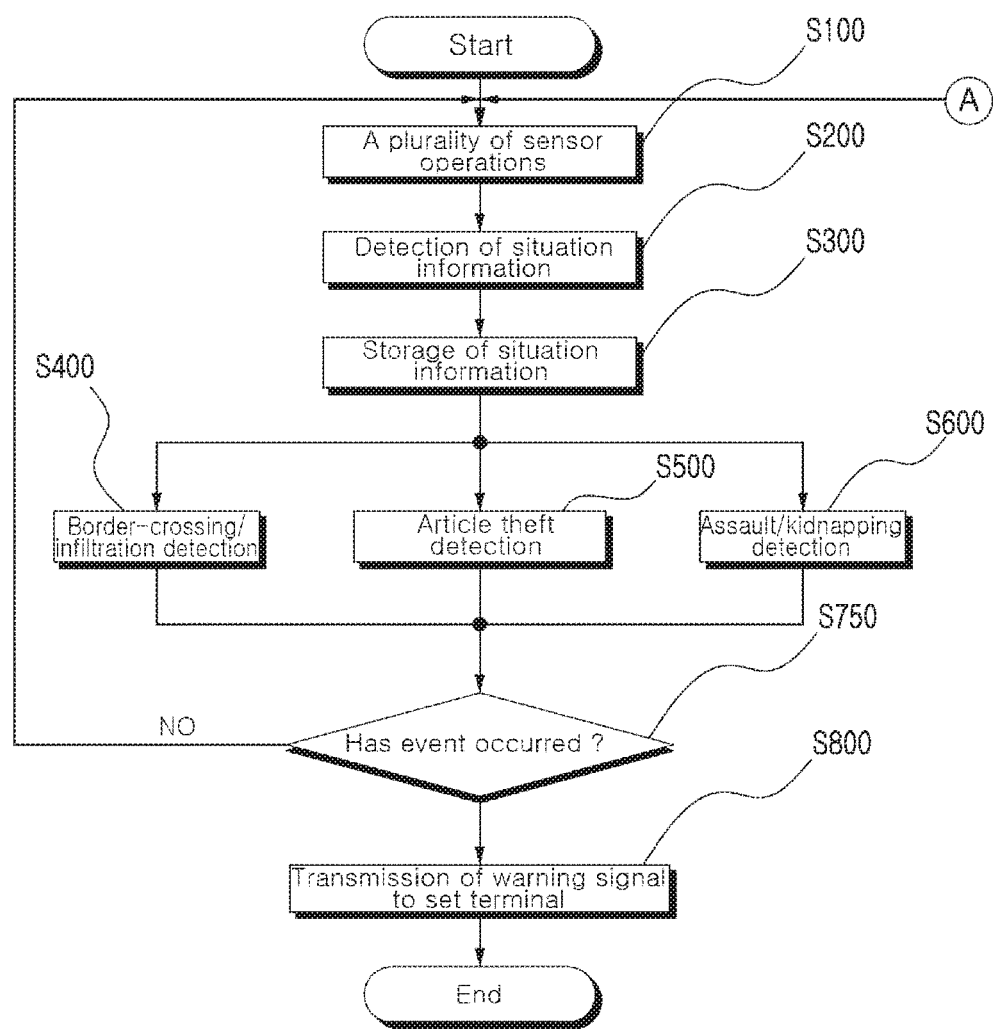
FIG. 5 is a flow chart showing a warning method using spatio-temporal situation data in accordance with an embodiment of the present disclosure.

FIG. 5 is a flow chart showing a warning method using spatio-temporal situation data in accordance with an embodiment of the present disclosure;

Referring to FIG. 5, the situation recognition unit 30 determines whether or not human-related data of any one of detection regions L21-L23 is inputted through a sensor module 10 or the situation detection unit 20 (step S100).

As a result of the determination, if it is determined that the human-related data are inputted, the situation recognition unit 30 compares the inputted human-related data with preset data regarding the human individual and determines whether or not the inputted human-related data is a human individual (step S200).

If is determined in step S200 that the inputted human-related data is the human individual, the situation recognition unit 30 determines whether or not the detection region (L21-L23) of which the inputted human-related data is determined as the human individual is any one selected from among a border-crossing/infiltration detection region, an article theft detection region, and an assault/kidnapping detection region, and then stores the human-related data in the storage unit 32 (step S300).

As a result of the determination in step S300, if it is determined that the detection region is the border-crossing/infiltration detection region, the situation recognition unit 30 compares the detected human-related data with data regarding set detection region, data regarding the event conditions based on the spatio-temporal situation data, and data regarding the human individual to determine whether or not an event has occurred (step S400).

As a result of the determination in step S300, if it is determined that the detection region is the article theft detection region, the situation recognition unit 30 compares the detected human-related data with data regarding set detection region, data regarding the event conditions based on the spatio-temporal situation data, and data regarding the human individual to determine whether or not an event has occurred (step S500).

As a result of the determination in step S300, if it is determined that the detection region is the assault/kidnapping detection region, the situation recognition unit 30 compares the detected human-related data with data regarding set detection region, data regarding the event conditions based on the spatio-temporal situation data, and data regarding the human individual to determine whether or not an event has occurred (step S600).

If is determined in steps (S400-S600) that any one of a border-crossing/infiltration event, an article theft event, and an assault/kidnapping event has occurred (step S750), the situation recognition unit 30 transmits a warning signal to the external terminal C through the communication network 40 (step S800).

Hereinafter, the border-crossing/infiltration detection step (S400) of FIG. 5 will be described in detail with reference to FIG. 6.

Figure 6:
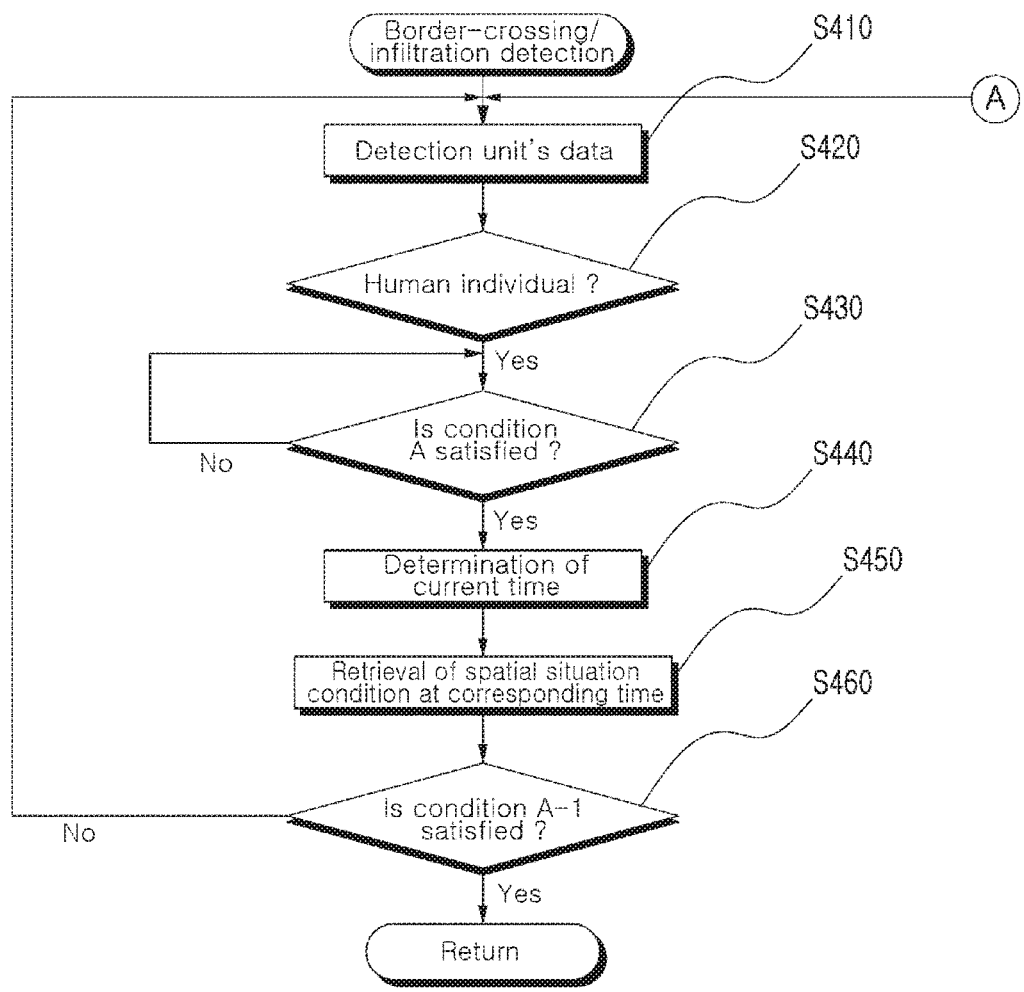
FIG. 6 is a flow chart showing a border-crossing/infiltration detection process in a warning method using spatio-temporal situation data in accordance with an embodiment of the present disclosure.

FIG. 6 is a flow chart showing a border-crossing/infiltration detection process in a warning method using spatio-temporal situation data in accordance with an embodiment of the present disclosure;

Referring to FIG. 6, the situation recognition unit 30 compares the human-related data detected by the situation detection unit 20 with data regarding set detection region, data regarding the event conditions based on the spatio-temporal situation data, and data regarding the human individual to determine whether or not an event has occurred (step S420).

If it is determined that the human-related data is a human individual M21 as a result of the determination in step (S420), the situation recognition unit 30 determines whether or not a condition A is satisfied in which a human S401 determined as the human individual M21 is detected as moving (M22) at a speed lower than a certain speed (e.g., a low speed of 500 m/h) set by an operator at a certain distance (e.g., less than 3 m from the barbed wire fence line) set by an operator who is located near a detection region L21 at a certain time set by the operator (S430).

As a result of the determination in step S430, if it is determined the condition A is satisfied, the situation recognition unit 30 determines whether or not a condition A-1 is satisfied in which a human (S402) detected in the above condition (A) based on the spatio-temporal situation data (step S440, step S450) is detected as abutting against the outermost portion of the detection region (e.g., a situation of cutting the barbed wire fence while abutting against the detection region)(S401), the human detected in the above condition (A) is detected as entering the outside or the inside of the detection region after passing through the outermost portion of the detection region (e.g., a situation of passing through the barbed wire fence by crossing over or cutting the barbed wire fence)(S403), or the human (S402) detected in the above condition (A) is detected as moving in a certain direction (V3) set by the operator in a state of having entered the outside or the inside of the detection region (L21, L1) (e.g., a situation of running away by passing through the barbed wire fence)(S403)(step S460).

Subsequently, if it is determined that the condition A-1 of step S460 is satisfied as a result of the determination in step S460, the situation recognition unit 30 determines that the current situation is a border crossing/infiltration detection situation and repeatedly performs the above previous steps.

Hereinafter, the article theft detection step (S500) of FIG. 5 will be described in detail with reference to FIG. 7.

Figure 7:
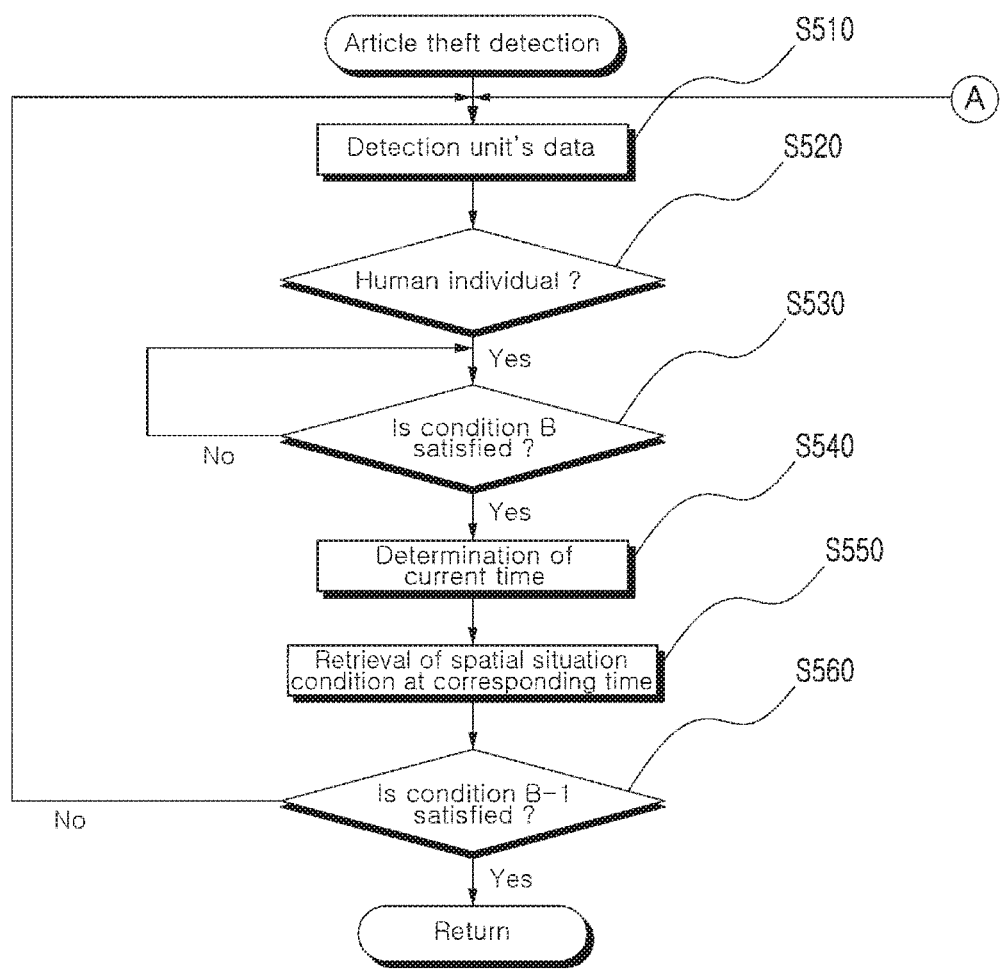
FIG. 7 is a flow chart showing an article theft detection process in a warning method using spatio-temporal situation data in accordance with an embodiment of the present disclosure.

FIG. 7 is a flow chart showing an article theft detection process in a warning method using spatio-temporal situation data in accordance with an embodiment of the present disclosure.

Referring to FIG. 7, the situation recognition unit 30 compares the human-related data (step 510) detected by the situation detection unit 20 with data regarding set detection region, data regarding the event conditions based on the spatio-temporal situation data, and data regarding the human individual to determine whether or not an event has occurred (step S520).

If it is determined that the human-related data is a human individual M24 as a result of the determination in step (S520), the situation recognition unit 30 determines whether or not a condition B is satisfied in which a human S501 determined as the human individual M24 is detected as moving at a speed lower than a certain speed (e.g., a low speed of 500 m/h) set by an operator at a certain distance set by an operator who is located near a detection region L22 at a certain time (i.e., from 21:00 p.m. when all the employees leave the office to 07:00 a.m. when they come to work) set by the operator (S530).

As a result of the determination in step S530, if it is determined the condition B is satisfied, the situation recognition unit 30 determines whether or not a condition B-1 is satisfied in which a human (S501) detected in the above condition (B) based on the spatio-temporal situation data (step S540, step S550) is detected as abutting against the outermost portion of the detection region L22 (e.g., a situation of reaching an entrance door and abutting against a door handle by grasping the door handle to intrude), the human detected in the above condition (B) is detected as entering the outside or the inside of the detection region after passing through the outermost portion of the detection region L22 (i.e., a state of opening the entrance door and then intruding)(M24), the human (S501) detected in the above condition (B) is detected as moving in a certain direction and at a speed higher than a certain speed set by the operator (i.e., a state of running away at a speed of more than 7 km/h with him/her carrying the loot) after combining with an object of a certain size (i.e., a state of holding a loot) in a state of having entered the inside of the detection region (M24)(not shown), or the human detected in the above condition (B) is detected as moving in a certain direction and at a speed higher than a certain speed set by the operator in a state of having entered the inside of the detection region (not shown) (step S560).

Subsequently, if it is determined that the condition B-1 of step S560 is satisfied as a result of the determination in step S560, the situation recognition unit 30 determines that the current situation is an article theft detection situation and repeatedly performs the above previous steps.

Hereinafter, the assault/kidnapping detection step (S600) of FIG. 5 will be described in detail with reference to FIG. 8.

Figure 8:
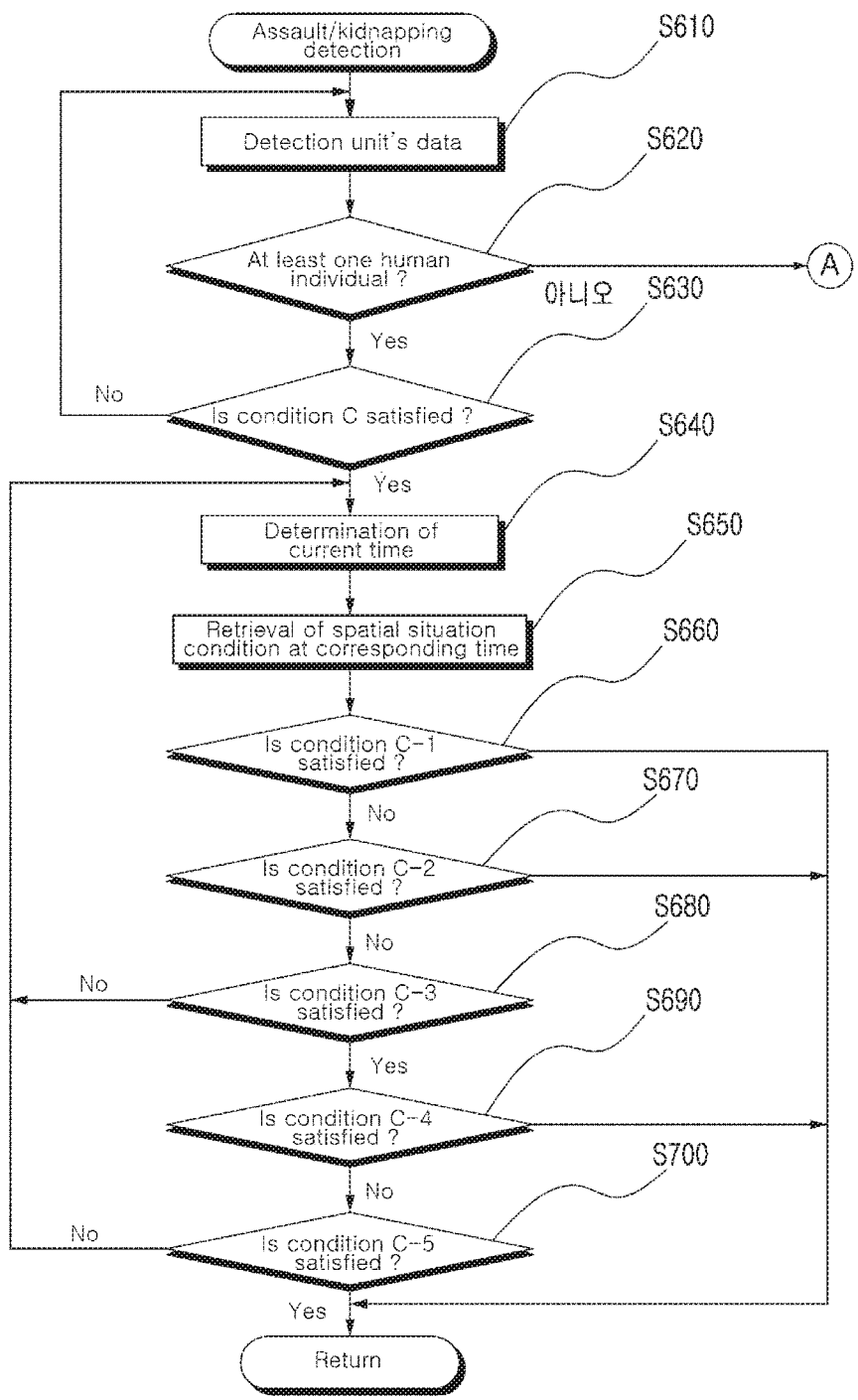
FIG. 8 is a flow chart showing an assault/kidnapping detection process in a warning method using spatio-temporal situation data in accordance with an embodiment of the present disclosure.

FIG. 8 is a flow chart showing an assault/kidnapping detection process in a warning method using spatio-temporal situation data in accordance with an embodiment of the present disclosure.

Referring to FIG. 8, the situation recognition unit 30 compares the human-related data (step 510) detected by the situation detection unit 20 with data regarding set detection region, data regarding the event conditions based on the spatio-temporal situation data, and data regarding the human individual to determine whether or not an event has occurred (step S620).

If it is determined that the occurred event is a human individual as a result of the determination in step (S620), the situation recognition unit 30 determines whether or not a condition C is satisfied in which at least two humans determined as human individuals (M25, M26) are detected as moving at a speed lower than a certain speed (i.e., 500 m/h) set by an operator while approaching each other at a distance shorter than a certain distance (i.e., a distance less than of 1 m in a previous step of the assault situation) set by the operator at a certain time (i.e., the time when no one must exist) set by the operator (step S630).

If it is determined that the condition C of step (630) is satisfied as a result of the determination in step (S630), the situation recognition unit 30 determines whether or not a condition C-1 is satisfied in which a scream- or violence-related noise detected for more than a certain time from any one of the detected at least two humans (S601, S602) based on the spatio-temporal situation data (step S640, step S650) in the above condition C is greater than a scream- or violence-related noise reference (i.e., more than 80 dB) set by the operator, and then the scream- or violence-related noise is not re-detected within a certain time or a laughing sound is not detected at least once (i.e., a situation where friends make a prank) (step S660).

If it is determined that the condition C of step (S630) is satisfied as a result of the determination in step (S630), the situation recognition unit 30 determines whether or not a condition C-2 is satisfied in which certain data set by the operator is detected from any one of the detected at least two humans based on the spatio-temporal situation data (step S640, step S650) for more than a certain time (e.g., 10 seconds) set by the operator (step S670).

If it is determined that the condition C of step (S630) is satisfied as a result of the determination in step (S630), the situation recognition unit 30 determines whether or not a condition C-3 is satisfied in which vehicle-related data (e.g., a car closing sound of more than 40 dB) and certain data (e.g., scream or violence-related noise) set by the operator are detected from any one of the detected at least two humans (S601, S602) for more than a certain time set by the operator (step S680).

If it is determined that the condition C-3 of step (S680) is satisfied as a result of the determination in step (S680), the situation recognition unit 30 determines whether or not a condition C-4 is satisfied in which the certain data detected from any one of the detected at least two humans (S601, S602) in the above condition (C-3) has a level lower than that of the certain data (i.e., less than 80 dB set as a violence-related noise reference) in the condition C-2, any one (i.e., an assaultee) of the detected at least two humans human(S601, S602) holds a smartphone SP installed with the warning system S using spatio-temporal situation data according to claim 1, and at which time the situation recognition unit 30 of the terminal C automatically transmits a warning signal to a certain contact C set by the operator and does not receive, more than the number of times set by the operator, a signal from a person concerned of the contact C set by the operator (step S690).

If it is determined that the condition C-3 of step (S680) is satisfied as a result of the determination in step (S680), the situation recognition unit 30 determines whether or not a condition C-5 is satisfied in which if any one case is fulfilled from among the case where data in which the smartphone SP roams around or goes far away from a certain area is detected for more than a certain time set by the operator, the case where the warning system S using spatio-temporal situation data is terminated without undergoing a certain termination process, and the case where the warning system using spatio-temporal situation data is not operated for more than a certain time (e.g., 1 minutes) set by the operator from a time point when data regarding the abnormal termination situation is transmitted to a terminal C of the person concerned, the inventive system S installed in the terminal C primarily automatically transmits a warning signal to the certain contact C set by the operator, at which time if the system does not receive, more than the number of times for more than a certain time set by the operator, a signal from a person concerned of the contact C set by the operator, the inventive system S installed in the terminal C secondarily automatically transmits the warning signal to the certain contact C set by the operator and then does not receive, more than the number of times for more than a certain time (e.g., 5 seconds) set by the operator, a signal from the person concerned of the contact C set by the operator (step S700).

Subsequently, if it is determined that the conditions C-1 to C-5 of steps (S660 to S700) are satisfied as a result of the determination in steps (S660 to S700), the situation recognition unit 30 determines that the current situation is an assault/kidnapping detection situation and repeatedly performs the above previous steps.

While the present disclosure has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present disclosure. Therefore, the true technical scope of the present disclosure should not be defined by the above-mentioned embodiments but should be defined by the appended claims and equivalents thereof.

What is claimed is:

1. A warning system using spatio-temporal situation data, comprising:
   a situation detection unit including a sensor module for detecting at least one human-related data among position, video, audio, vibration, motion and environment information of an environment requiring an early warning for various types of security and anti-crime situations;
   a situation recognition unit for setting one or more detection regions which are to be detected by the situation detection unit and event conditions based on spatio-temporal situation data, setting a human individual as a human detection condition based on the spatio-temporal situation data, comparing the human-related data detected by the situation detection unit with data regarding the set detection regions, data regarding the event conditions based on the spatio-temporal situation data, and data regarding the human individual to determine whether or not an event has occurred, and transmitting a warning signal to an external terminal through a communication network if it is determined that the event has occurred;
   a storage unit for storing the human-related data detected by the situation detection unit, the data regarding the detection regions set by the situation recognition unit, the data regarding the spatio-temporal event conditions of humans to be detected, and the data regarding the human individual;
   a time data reception unit for receiving current time information; and an input unit for inputting the spatio-temporal situation data on which the setting of the detection regions to be detected, the human individual, and the event conditions is based;

wherein the spatio-temporal situation data comprises data regarding a particular time slot-specific physiological pattern and a particular time slot-specific social pattern that are distinct from other creatures, data regarding time slot-specific crime rates, data regarding a physiological behavior pattern and a social behavior pattern that are taken by the human at the place at a particular time slot in a criminal situation, and data regarding a particular behavior pattern associated with a criminal situation at the place, is configured based on statistical data and scientific data, and is used as a standard data that determines a threshold value for the detection of the event by the situation recognition unit.

2. The warning system using spatio-temporal situation data according to claim 1, wherein the external terminal to which the warning signal from the situation recognition unit is to be transmitted is a control PC of a CCTV control center, a police operation room, or a smartphone and receives the warning signal from the situation recognition unit, and a transmission contact number of the situation recognition unit is directly set by an operator through the input unit.

3. The warning system using spatio-temporal situation data according to claim 1, wherein the warning system using spatio-temporal situation data is installed and operated in a smartphone and a CCTV control PC of an individual and an enterprise requiring security/anti-crime.

4. The warning system using spatio-temporal situation data according to claim 1, wherein the time data reception unit receives exact time data necessary to allow the situation recognition unit to compare the spatio-temporal situation data and the data regarding the human individual of the human with the detected human-related data to determine whether or not the event has occurred at the moment when the human is detected by the situation detection unit.

5. The warning system using spatio-temporal situation data according to claim 1, wherein the human detection condition of the human individual, which is set by the situation recognition unit, is composed of threshold values such as situation-specific images of the human according to expected spatio-temporal situation-specific activity patterns of a human who performs border-crossing/infiltration/theft/ assault/kidnapping, stumbling or swinging motion, voice, footstep and distinctive movement speed/direction, and noises made by the human.

6. The warning system using spatio-temporal situation data according to claim 1, wherein the event conditions according to the spatio-temporal situation-specific activity patterns, which are set by the situation recognition unit comprise at least one of a border-crossing/infiltration detection condition, an article theft detection condition, and an assault/kidnapping detection condition.

7. The warning system using spatio-temporal situation data according to claim 6, wherein the border-crossing/ infiltration detection condition comprises (A) a case where a condition is satisfied in which a human determined as a human individual is detected as moving at a speed lower than a certain speed set by an operator at a certain distance set by an operator who is located near a detection region at a certain time set by the operator; and (A-1) a case where a condition is satisfied in which a human detected in the above condition (A) is detected as abutting against the outermost portion of the detection region, the human detected in the above condition (A) is detected as entering the outside or the inside of the detection region after passing through the outermost portion of the detection region, or the human detected in the above condition (A) is detected as moving in a certain direction set by the operator in a state of having entered the outside or the inside of the detection region.

8. The warning system using spatio-temporal situation data according to claim 6, wherein the article theft detection condition comprises (B) a case where a condition is satisfied in which a human determined as a human individual is detected as moving at a speed lower than a certain speed set by an operator at a certain distance set by an operator who is located near a detection region at a certain time set by the operator; and (B-1) a case where a condition is satisfied in which a human detected in the above condition (B) is detected as abutting against the outermost portion of the detection region, the human detected in the above condition (B) is detected as entering the outside or the inside of the detection region after passing through the outermost portion of the detection region, the human detected in the above condition (B) is detected as moving in a certain direction and at a speed higher than a certain speed set by the operator after combining with an object of a certain size in a state of having entered the inside of the detection region, or the human detected in the above condition (B) is detected as moving in a certain direction and at a speed higher than a certain speed set by the operator in a state of having entered the inside of the detection region.

9. The warning system using spatio-temporal situation data according to claim 6, wherein the assault/kidnapping detection condition comprises:

(C) a case where a condition is satisfied in which at least two humans determined as human individuals are detected as moving at a speed lower than a certain speed set by an operator while approaching each other at a distance shorter than a certain distance set by the operator at a certain time set by the operator;

(C-1) a case where a condition is satisfied in which a scream- or violence-related noise detected for more than a certain time from any one of the detected at least two humans based on the spatio-temporal situation data in the above condition is greater than a scream- or violence-related noise reference set by the operator, and then the scream- or violence-related noise is not re-detected within a certain time or a laughing sound is not detected at least once;

(C-2) a case where a condition is satisfied in which certain data set by the operator is detected from any one of the detected at least two humans for more than a certain time set by the operator in the above condition (C);

(C-3) a case where a condition is satisfied in which vehicle-related data and certain data set by the operator are detected from any one of the detected at least two humans for more than a certain time set by the operator in the above condition (C);

(C-4) a case where a condition is satisfied in which if the certain data detected from any one of the detected at least two humans in the above condition (C-3) has a level lower than that of the certain data in the above condition (C-2), any one of the detected at least two humans holds a smartphone SP installed with the warning system S using spatio-temporal situation data according to claim 1, and at which time the situation recognition unit of the terminal C automatically transmits a warning signal to a certain contact C set by the operator and does not receive, more than the number of times set by the operator, a signal from a person concerned of the contact C set by the operator; and (C-5) a case where a condition is satisfied in which if any one case is fulfilled from among the case where data in which the smartphone SP roams around or goes far away from a certain area is detected for more than a certain time set by the operator, the case where the warning system S using spatio-temporal situation data is terminated without undergoing a certain termination process, and the case where the warning system using spatio-temporal situation data is not operated for more than a certain time set by the operator from a time point when data regarding the abnormal termination situation is transmitted to a terminal C of the person concerned, in the above condition (C-3), the inventive system S installed in the terminal C primarily automatically transmits a warning signal to the certain contact C set by the operator, at which time if the system does not receive, more than the number of times for more than a certain time set by the operator, a signal from a person concerned of the contact C set by the operator, the inventive system S installed in the terminal C secondarily automatically transmits the warning signal to the certain contact C set by the operator and then does not receive, more than the number of times for more than a certain time set by the operator, a signal from the person concerned of the contact C set by the operator.

10. The warning system using spatio-temporal situation data according to claim 6, wherein a time slot having a high possibility of occurrence of an event in detection of the border-crossing/infiltration event is set as follows: In the case where the detection region is a border, the time slot having a high possibility of occurrence of the event is set as a time slot other than the time slot when an image is detected in which soldiers who are in charge of performing border guard services patrol the border; In the case where the detection region is a major national facility, the time slot having a high possibility of occurrence of the event is set as a time slot when no one must exist averagely in the surroundings of a barbed wire fence or a boundary wall; In the case where the detection region is rice fields or fields, the time slot having a high possibility of occurrence of the event is set as a time slot when frequent infiltration occurs averagely; In the case where the detection region is a private home, a store or an office, the time slot having a high possibility of occurrence of the event is set as a time slot when no one must come in and go out averagely; or In the case where the detection region is an elementary school, the time slot having a high possibility of occurrence of the event is set as a time slot when no one must be detected except elementary school students averagely, wherein a time slot having a high possibility of occurrence of an event in detection of the article theft event is set as follows: In the case where the detection region is a place where the surroundings of the detection region is patrolled periodically by a person in charge of patrol, the time slot having a high possibility of occurrence of the event is set as a time slot other than the time slot when an image is detected in which the person in charge of patrol patrols the detection region; In the case where the detection region is a place where there is no one who patrols and many people come and go, the time slot having a high possibility of occurrence of the event is set as a time slot when no one must exist averagely in the surroundings of the detection region; In the case where the detection region is a place where there is no one who patrols and people rarely come and go, the time slot having a high possibility of occurrence of the event is set as a time slot when frequent infiltration occurs; In the case where the detection region is a private home, a store or an office, the time slot having a high possibility of occurrence of the event is set as a time slot when no one must be detected averagely; or In the case where the detection region is an elementary school, the time slot having a high possibility of occurrence of the event is set as a time slot when no one must be detected except elementary school students averagely; and wherein a time slot having a high possibility of occurrence of an event in detection of the assault/kidnapping event is set as follows: In the case where the detection region is a place where the surroundings of the detection region is patrolled periodically by a person in charge of patrol, the time slot having a high possibility of occurrence of the event is set as a time slot other than the time slot when an image is detected in which the person in charge of patrol patrols the detection region; In the case where the detection region is a place where there is no one who patrols and many people come and go, the time slot having a high possibility of occurrence of the event is set as a time slot when no one must exist averagely in the surroundings of the detection region; In the case where the detection region is a place where there is no one who patrols and people rarely come and go, the time slot having a high possibility of occurrence of the event is set as a time slot when frequent assault/kidnapping occurs averagely; and In the case where the detection region is a private home, a store or an office, the time slot having a high possibility of occurrence of the event is set as a time slot when no one must be detected averagely.

11. The warning system using spatio-temporal situation data according to claim 7, wherein the event conditions of the situation in which the detected human moves in a state of having entered the outside or the inside of the detection region and which is set by the situation recognition unit are as follows: In the case where the detected human crosses over a barbed wire fence Sor a boundary wall installed in a border or a major national facility, the moving speed of the human is lower than a certain speed and the situation is silent; In the case where an object has a moving direction generally perpendicular to the barbed wire fence or crosses over a barbed wire fence or a boundary wall installed in rice fields or fields and the crop is cheap, the object is an animal that is smaller than a human and is approximate to an elliptical shape in its entirety; In the case where an object has a moving speed higher than a certain speed, has a voice peculiar to animals, and has a moving speed lower than a certain speed in the course of giving damage to the crop, and the crop is expensive, the object is a human individual; and In the case where an object has a moving speed lower than a certain speed, has a moving direction generally perpendicular to the barbed wire fence or the boundary wall, or intrudes a private home, a stores or an office, the object is a human individual who has a very low moving speed and is very quick when running away after the intrusion.

12. The warning system using spatio-temporal situation data according to claim 9, wherein the vehicle-related data set by the operator in the condition (C-3) comprises a vehicle door closing sound.

13. The warning system using spatio-temporal situation data according to claim 9, wherein the detection of the data in which the smartphone SP roams around or goes far away from a certain area in the condition (C-5) is performed in such a manner that a preset 'question' window having no connection with the warning situation progress is displayed on a screen of the smartphone SP so that an assailant of the assault/kidnapping event cannot know the warning situation progress immediately after the condition (C-3) is fulfilled, and if the assaultee does not have a preset answer to the question within a certain time or makes a false answer to the question consecutively twice, the data is detected as a warning situation.

14. The warning system using spatio-temporal situation data according to claim 5, wherein the situation-specific image data used to detect the human among data regarding the human individual set by the operator is set as a long elliptical shape similar to the outward appearance of a human, a shape in which a small circle similar to the shape of a head portion of the human and a long elliptical shape similar to that of a body portion of the human under the head portion are combined with each other, or a shape in which the small circle similar to the shape of the head portion of the human and a long rectangular shape similar to that of the body portion of the human under the head portion are combined with each other.

15. The warning system using spatio-temporal situation data according to claim 14, wherein the image data is detected as a human when it is determined that a situation of the figure is a form in which the figure is generally perpendicular to the ground surface and a moving speed is a 'walking or running speed' or when it is determined that the figure is a form in which the figure is generally in parallel with the ground surface and the moving speed is a 'crawling speed' in the case where the image data is a distinctive figure in which a relatively small and round-shaped figure abuts against the uppermost end of the long elliptical shape or the long rectangular shape of the figure, or the image data is detected as a human when it is determined that a situation of the figure is a situation in which 'the figure stays at a place for more than a certain period of time set by an operator' in the case where the image data is a round circular shaped figure, and the image data is detected as an animal in the case other than the above-described conditions.

16. The warning system using spatio-temporal situation data according to claim 15, wherein a sensor module of the situation detection unit for detecting the human based on the image data performs a detection function through at least one of a camera sensor and a motion sensor, and a sensor module for detecting the 'walking or running speed' of the human performs a detection function through at least one of a camera sensor, a microphone, and a vibration sensor.

17. A warning method using a spatio-temporal situation data warning system according to claim 1, comprising the steps of:
   (1) allowing a situation recognition unit to determine whether or not human-related data of at least one of detection regions is inputted through a sensor module of a situation detection unit;
   (2) allowing the situation recognition unit to compare the inputted human-related data with preset human individual data and determine whether or not the inputted human-related data is a human individual of the preset human individual data;
   (3) allowing the situation recognition unit to determine whether or not the detection region of which the inputted human-related data is determined as the human individual is any one selected from among a border-crossing/infiltration detection region, an article theft detection region, and an assault/kidnapping detection region, and then store the human-related data in a storage unit;
   (4) allowing, if it is determined that the detection region is the border-crossing/infiltration detection region, the situation recognition unit to compare the detected human-related data with data regarding set detection regions, data regarding the event conditions based on the spatio-temporal situation data, and data regarding the human individual to determine whether or not an event has occurred;
   (5) allowing, if it is determined that the detection region is the article theft detection region, the situation recognition unit to compare the detected human-related data with data regarding set detection regions, data regarding the event conditions based on the spatio-temporal situation data, and data regarding the human individual to determine whether or not an event has occurred;
   (6) allowing, if it is determined that the detection region is the assault/kidnapping detection region, the situation recognition unit to compare the detected human-related data with data regarding set detection regions, data regarding the event conditions based on the spatio-temporal situation data, and data regarding the human individual to determine whether or not an event has occurred; and
   (7) allowing, if is determined that any one of a border-crossing/infiltration event, an article theft event, and an assault/kidnapping event has occurred, the situation recognition unit to transmit a warning signal to an external terminal through a communication network.

18. The warning method using spatio-temporal situation data according to claim 17, wherein step (4) comprises the steps of:
   (4-1) allowing, if it is determined that the detection region where the human is detected is the border crossing/infiltration detection region as a result of the determination in step (3), the situation recognition unit to compare the human-related data detected by the situation detection unit with data regarding set detection regions, data regarding the event conditions based on the spatio-temporal situation data, and data regarding the human individual to determine whether or not an event has occurred;
   (4-2) allowing, if it is determined that the human-related data is a human individual as a result of the determination in step (4-1), the situation recognition unit to determine whether or not a condition A is satisfied in which a human determined as the human individual is detected as moving at a speed lower than a certain speed set by an operator at a certain distance set by an operator who is located near a detection region at a certain time set by the operator;
   (4-3) allowing, if it is determined that the condition of step (4-2) is satisfied as a result of the determination in step (4-2), the situation recognition unit to determine whether or not a condition A-1 is satisfied in which a human detected based on the spatio-temporal situation data is detected as abutting against the outermost portion of the detection region, the human detected in the above condition of step (4-2) is detected as entering the outside or the inside of the detection region after passing through the outermost portion of the detection region, or the human detected in the above condition of step (S4-2) is detected as moving in a certain direction set by the operator in a state of having entered the outside or the inside of the detection region; and
   (4-4) allowing, if it is determined that the condition of step (4-3) is satisfied as a result of the determination in step (4-3), the situation recognition unit to determine that the current situation is a border crossing/infiltration situation and repeatedly perform the above previous steps.

19. The warning method using spatio-temporal situation data according to claim 17, wherein step (5) comprises the steps of:
(5-1) allowing, if it is determined that the detection region where the human is detected is the article theft detection region as a result of the determination in step (3), the situation recognition unit to compare the human-related data detected by the situation detection unit with data regarding set detection regions, data regarding the event conditions based on the spatio-temporal situation data, and data regarding the human individual to determine whether or not an event has occurred;
(5-2) allowing, if it is determined that the human-related data is a human individual as a result of the determination in step (5-1), the situation recognition unit to determine whether or not a condition B is satisfied in which a human determined as the human individual is detected as moving at a speed lower than a certain speed set by an operator at a certain distance set by an operator who is located near a detection region at a certain time set by the operator;
(5-3) allowing, if it is determined that the condition of step (5-2) is satisfied as a result of the determination in step (5-2), the situation recognition unit to determines whether or not a condition B-1 is satisfied in which a human detected in the above condition (B) based on the spatio-temporal situation data is detected as abutting against the outermost portion of the detection region, the human detected in the condition (B) of step (5-2) is detected as entering the outside or the inside of the detection region after passing through the outermost portion of the detection region, the human detected in the condition (B) of step (5-2) is detected as moving in a certain direction and at a speed higher than a certain speed set by the operator after combining with an object of a certain size in a state of having entered the inside of the detection region, or the human detected in the condition (B) of step (5-2) is detected as moving in a certain direction and at a speed higher than a certain speed set by the operator in a state of having entered the inside of the detection region; and
(5-4) allowing, if it is determined that the condition of step (5-3) is satisfied as a result of the determination in step (5-3), the situation recognition unit to determine that the current situation is an article theft detection situation and repeatedly perform the above previous steps.

20. The warning method using spatio-temporal situation data according to claim 17, wherein step (6) comprises the steps of:
(6-1) allowing, if it is determined that the detection region where the human is detected is the assault/kidnapping detection region as a result of the determination in step (3), the situation recognition unit to compare the human-related data detected by the situation detection unit with data regarding set detection regions, data regarding the event conditions based on the spatio-temporal situation data, and data regarding the human individual to determine whether or not an event has occurred;
(6-2) allowing, if it is determined that the occurred event is a human individual as a result of the determination in step (6-1), the situation recognition unit to determine whether or not a condition is satisfied in which at least two humans determined as human individuals are detected as moving at a speed lower than a certain speed set by an operator while approaching each other at a distance shorter than a certain distance set by the operator at a certain time set by the operator;
(6-3) allowing, if it is determined that the condition of step (6-2) is satisfied as a result of the determination in step (6-2), the situation recognition unit to determine whether or not a condition is satisfied in which a scream- or violence-related noise detected for more than a certain time from any one of the detected at least two humans based on the spatio-temporal situation data in the above condition is greater than a scream- or violence-related noise reference set by the operator, and then the scream- or violence-related noise is not re-detected within a certain time or a laughing sound is not detected at least once;
(6-4) allowing, if it is determined that the condition of step (6-2) is satisfied as a result of the determination in step (6-2), the situation recognition unit to determine whether or not a condition is satisfied in which certain data set by the operator is detected from any one of the detected at least two humans based on the spatio-temporal situation data for more than a certain time set by the operator;
(6-5) allowing, if it is determined that the condition of step (6-2) is satisfied as a result of the determination in step (6-2), the situation recognition unit to determine whether or not a condition is satisfied in which vehicle-related data and certain data set by the operator are detected from any one of the detected at least two humans for more than a certain time set by the operator;
(6-6) allowing, if it is determined that the condition of step (6-5) is satisfied as a result of the determination in step (6-5), the situation recognition unit to determine whether or not a condition is satisfied in which the certain data detected from any one of the detected at least two humans in the above condition (C-3) has a level lower than that of the certain data in step (6-4), any one of the detected at least two humans holds a smartphone SP installed with the warning system S using spatio-temporal situation data according to claim 1, and at which time the situation recognition unit of the terminal C automatically transmits a warning signal to a certain contact C set by the operator and does not receive, more than the number of times set by the operator, a signal from a person concerned of the contact C set by the operator;
(6-7) allowing, if it is determined that the condition of step (6-5) is satisfied as a result of the determination in step (6-5), the situation recognition unit to determine whether or not a condition is satisfied in which if any one case is fulfilled from among the case where data in which the smartphone SP roams around or goes far away from a certain area is detected for more than a certain time set by the operator, the case where the warning system S using spatio-temporal situation data is terminated without undergoing a certain termination process, and the case where the warning system using spatio-temporal situation data according to claim 1 is not operated for more than a certain time set by the operator from a time point when data regarding the abnormal termination situation is transmitted to a terminal C of the person concerned, the inventive system S installed in the terminal C primarily automatically transmits a warning signal to the certain contact C set by the operator, at which time if the system does not receive, more than the number of times for more than a certain time set by the operator, a signal from a person concerned of the contact C set by the operator, the inventive system S installed in the terminal C secondarily automatically transmits the warning signal to the certain contact C set by the operator and then does not receive, more than the number of times for more than a certain time set by the operator, a signal from the person concerned of the contact C set by the operator; and (6-8) allowing, if it is determined that the conditions of steps (6-4 to 6-7) is satisfied as a result of the determination in steps (6-4 to 6-7), the situation recognition unit to determine that the current situation is an assault/kidnapping detection situation and repeatedly perform the above previous steps.

* * * * *